(12) United States Patent
Escoda et al.

(10) Patent No.: US 11,924,257 B2
(45) Date of Patent: Mar. 5, 2024

(54) SYSTEMS AND METHODS FOR PROVIDING MEDIA COMMUNICATION PROGRAMMABLE SERVICES

(71) Applicant: VONAGE BUSINESS INC., Holmdel, NJ (US)

(72) Inventors: Òscar Divorra Escoda, Barcelona (ES); John G O'Connell, Barcelona (ES); Caio de Mello Rossi, Barcelona (ES); Rajkiran Talusani, Singapore (SG); Yee Hui Poh, Singapore (SG); Roy Ben Shoushan, Rishon Lezion (IL)

(73) Assignee: Vonage Business Inc., Holmdel, NJ (US)

( * ) Notice: Subject to any disclaimer, the term of this patent is extended or adjusted under 35 U.S.C. 154(b) by 0 days.

(21) Appl. No.: 17/743,666

(22) Filed: May 13, 2022

(65) Prior Publication Data
US 2022/0368739 A1    Nov. 17, 2022

Related U.S. Application Data

(60) Provisional application No. 63/188,525, filed on May 14, 2021.

(51) Int. Cl.
*H04L 65/403* (2022.01)
*H04L 12/18* (2006.01)
*H04L 65/402* (2022.01)

(52) U.S. Cl.
CPC ........ *H04L 65/403* (2013.01); *H04L 12/1831* (2013.01); *H04L 65/402* (2022.05)

(58) Field of Classification Search
CPC .......................................... H04L 65/00–65/80
See application file for complete search history.

(56) References Cited

U.S. PATENT DOCUMENTS

| | | | |
|---|---|---|---|
| 9,936,045 B2 * | 4/2018 | Assem Aly Salama | ..................... H04L 67/61 |
| 2012/0140016 A1 | 6/2012 | Shanmukhadas et al. | |
| 2012/0327182 A1 | 12/2012 | King et al. | |

(Continued)

OTHER PUBLICATIONS

International Search Report dated Aug. 29, 2022 for PCT/US2022/029152.

(Continued)

*Primary Examiner* — Clayton R Williams
(74) *Attorney, Agent, or Firm* — FisherBroyles, LLP; Joseph Pagnotta

(57) ABSTRACT

Systems and methods for providing real-time media communication services to make use of a software application resident on a server that receives the media feeds of multiple sending participants, and generates a single composed media feed that includes media feeds of the sending participants and that sends the composed media feed to other computing services for manifold purposes like recording, re-broadcasting and/or re-transmission to remote computing devices of multiple real-time media communication participants. The composed media feed can include supplementary information in addition to the media feeds of live participants. This supplementary information is provided by means of API configurable programmatic code that is then executed and used as the software application resident on the server.

22 Claims, 15 Drawing Sheets

(56) References Cited

U.S. PATENT DOCUMENTS

| | | | |
|---|---|---|---|
| 2014/0267569 A1* | 9/2014 | Periyannan | H04L 65/765 |
| | | | 348/14.08 |
| 2017/0061092 A1* | 3/2017 | Baratpour | H04L 65/403 |
| 2017/0318260 A1* | 11/2017 | Torres | H04L 67/52 |
| 2018/0131746 A1* | 5/2018 | Kroepfl | H04L 65/403 |
| 2021/0076001 A1 | 3/2021 | Periyannan et al. | |

OTHER PUBLICATIONS

Written Opinion dated Aug. 29, 2022 for PCT/US2022/029152.
McClure, Matthew; "The state of going live from a browser," (Apr. 13, 2020), 5 Pages; https://www.mux.com/blog/the-state-of-going-live-from-a-browser.
"Muxinc / chromium_broadcast_demo", (May 12, 2022); https://github.com/muxinc/chromium_broadcast_demo.

* cited by examiner

SYSTEMS AND METHODS FOR PROVIDING MEDIA COMMUNICATION PROGRAMMABLE SERVICES

BACKGROUND OF THE INVENTION

FIGS. 1A-1C illustrate typical video conferencing and/or real-time media communications environments in which multiple sending connections (could be presenters, participants or could be any other source of media) 102, 104, 106 provide video feeds 102A, 104A, 106A to a server 108 that coordinates the media transmission. The server 108 could be a multipoint control unit (MCU) that connects different endpoints (e.g. receiving participants and/or sending presenters, or any combination of sending and/or receiving endpoints) providing appropriate media streams to all receiving endpoints. An MCU can perform video mixing, transcoding, security functions, as well as a range of other services. Most modern video communication services use a Selective Forwarding Unit (SFU) instead as a server 108, where media is selectively, packet by packet, forwarded from sending connections to receiving ones so that no need for mixing and/or transcoding is required. Packet selection for forwarding is based on a variety of strategies and smart decisions by the server to handle user quality of experience, quality of service, cost of operation, network usage, etc. Each endpoint, without loss of generality, can be connected by one or several network connections to the server. SFUs provide full flexibility to receiving endpoints to process individual media streams and arrange them as needed individually since each media stream is preserved independent (unlike on MCUs).

As illustrated in FIG. 1A, in a typical state of the art real-time media communications environment, the service provides all of the individual media streams 102A, 104A, 106A to each individual participant and/or endpoint 110, 112, 114. This allows each endpoint 110, 112, 114 to arrange the media streams of the sending endpoints in any way that is deemed most helpful or convenient to a participant and/or receiving endpoint. This is common in real-time media communications, such as video conferencing, or even in near-real-time communications, where the media (e.g. video) feeds of each presenter and/or sender 102, 104, 106 are being seen essentially immediately by at least one of a participant and/or receiving endpoint. This ensures so-called interactive media communications. In a conferencing scenario, it allows participants to timely provide feedback, like posing questions to the presenting participants, and to interject as necessary such that the video conference closely resembles an in-person meeting. FIGS. 1B and 10 depict how an endpoint typically hosts both sender & receiver. Any order or combination of senders and receivers into a given endpoint application could be considered. FIGS. 1B and 10 depict examples of a real time communications system for the particular purpose of a video conferencing use case. At the same time, real-time media communications, and the scope of this disclosure, cover any other uses including applications of real-time media communications such as, but not limited to, social networking, e-learning, e-health, webinars, etc. Also, these can use any sort of communication topologies involving any combination of interactive low delay transmissions and delay-tolerant media transmissions, with diverse sending receiving participants topologies, from one or few sending participants to a very large number of receiving participants (e.g. 1:N or M:N, where N>M and even N>>M), to a very large number of sending participants and few selective receiving participants (M:N where M>N and even M>>N), while also even balanced N:N participant sessions, where the number of sending and receiving participants is equal. Sending and receiving participants may be the same participants, or distinct participants. Participant endpoints, may or may not be used by a subject. An endpoint may just be a programmatic application and/or destination service, or any other agent that consumes and/or generates media with its application for any purpose.

The price of the flexibility and scalability provided by an SFU server 108 is that it must send all media feeds for all of the sending participants 102, 104, 106 to each receiving participant, this places an increased processing cost on endpoints as well as on networking usage. At the same time, it places a much lower processing burden on the server 108, than an MCU would imply. On the other hand, if one can give up the flexibility, the cost of composing receiving views can be centralized in a single processing point like in MCUs (FIG. 10), having way more cost on the server, and spare communication and endpoint resources. Besides the server cost, the problems of the MCU, and the usual mixing and transcoding embedded in them is the lack of flexibility translated on a limited set of media composing and mixing preset and configurability available for choice.

It is common in different real-time media communication systems, to have services that receive one or many of the media streams being transmitted with the purpose of composing those or a part of them together to generate a unified output media stream. This is done by means of combining and mixing audio and/or video streams together. Being the purpose of this resulting composed stream of manifold possibilities. A list of those purposes, but not limited to are: recording, re-broadcasting using real-time interactive technologies, or delay tolerant such as HLS transmissions, or as a feed for a Media Gateway such as a custom-WebRTC-to-SIP interconnection Gateway, etc. These composing services are commonly limited to mixing the media feeds provided by sending participant endpoints. These media feeds being controllable through service APIs, as well as being possible to control by means of parametrized APIs the specific composing arrangement layout, inclusion and/or exclusion of media feeds, that in most complex services, the layout can be even specified by means of Cascading Style Sheets (CSS) descriptive code as seen and described in https://tokbox.com/developer/guides/archiving/layout-control.html and https://tokbox.com/developer/guides/archive-broadcast-layout/.

During an actual media real-time communication (e.g. a video conference), it is common for a range of supplementary information to also be available to the presenters and/or participants and be part of the communication, as a component part of the application/s enabling the communication. The supplementary information can include, but not necessarily be limited to, at least one of a list of individuals that take part in the media communication session, the current status of participants, a dedicated window into which participants can type questions, text messaging windows, as well as a variety of additional information, and any other additional information rendered and displayed by the communications application. Often this supplementary information is presented around the edges of a participant's display screen, with one or more video feeds of presenters or participants arranged in the center of the display screen. Any other arrangement layouts including all, or part of the participants media information together with all or part of any communications additional information and/or programmable media and/or visual effects are also possible as part of the presentation to a participant's endpoint application display.

Furthermore, as mentioned above, when such a real-time media communication session is composed, with the exemplary purpose of being recorded, it is mostly the media feeds of the presenters that are being recorded. Supplementary information and/or visual effects are a de minimis part of the recording, and if some expression of those is present, are normally limited to a preset of options. This is a significant drawback, as there are times that the supplementary information forms a significant part of the overall communications experience, and/or additional arbitrary visual effects are desired in a recording and/or broadcast, that go beyond the possibilities of simple preset parameters, HTML and/or CSS.

DETAILED DESCRIPTION OF PREFERRED EMBODIMENTS

The following detailed description of preferred embodiments refers to the accompanying drawings, which illustrate specific embodiments of the invention. Other embodiments having different structures and operations do not depart from the scope of the present invention.

Figure 2A:
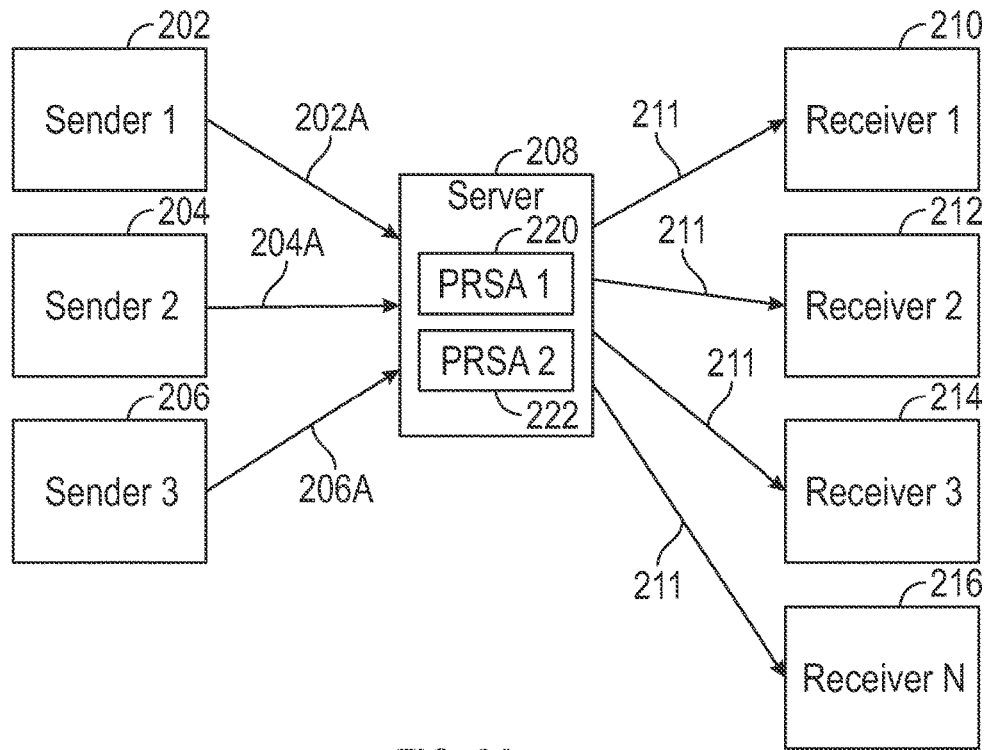
FIGS. 2A-2E are diagrams illustrating a variety of schematic layouts of elements of a real-time media communications environments embodying the invention.

FIG. 2A illustrates a way of conducting a real-time media communications session where composed media feeds of all of the senders are sent to each receiving participant. As shown in FIG. 2A, the senders 202, 204, 206 send their respective media fees 202A, 204A, 206A to a server 208. A first programmable renderer software application (PRSA) 220 on the server 208 then uses the sender video feeds 202A, 204A, 206A to generate a composed video feed 211 that includes the sender media feeds 202A, 204A, 206A. The composed video feed 211 may also include various items of supplementary information and media and visual effects. The first PRSA 220 then sends the composed video feed 211 to the computing devices of each of the participants 210, 212, 214, 216. Unlike composing in well known MCUs, in an embodiment of this invention composing is instead generated by means of a programmable renderer unit executing a software application provided as part of the control commands of the real-time media communications service (e.g. video conferencing).

Figure 1A:
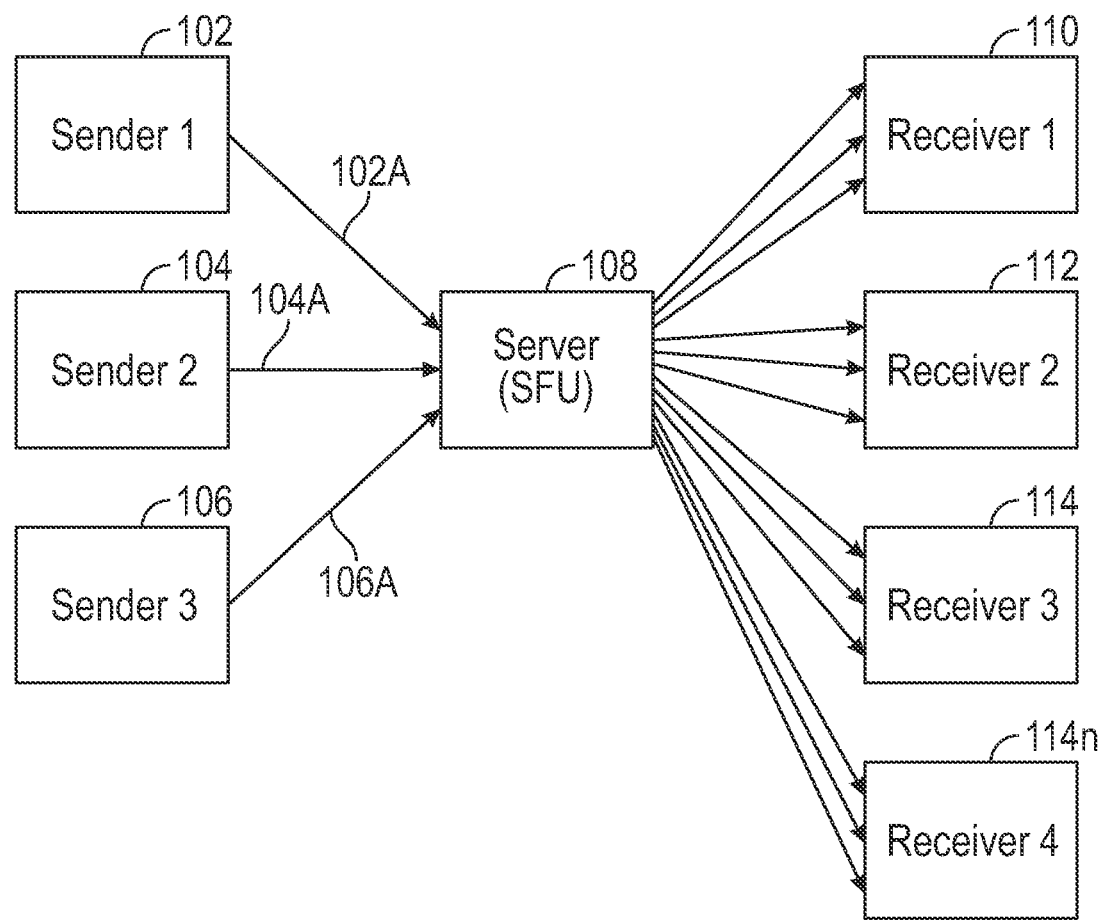
FIGS. 1A-1C are diagrams illustrating a variety of schematic layouts of background art real-time communications environments such as a video conferencing environment.
Figure 1B:
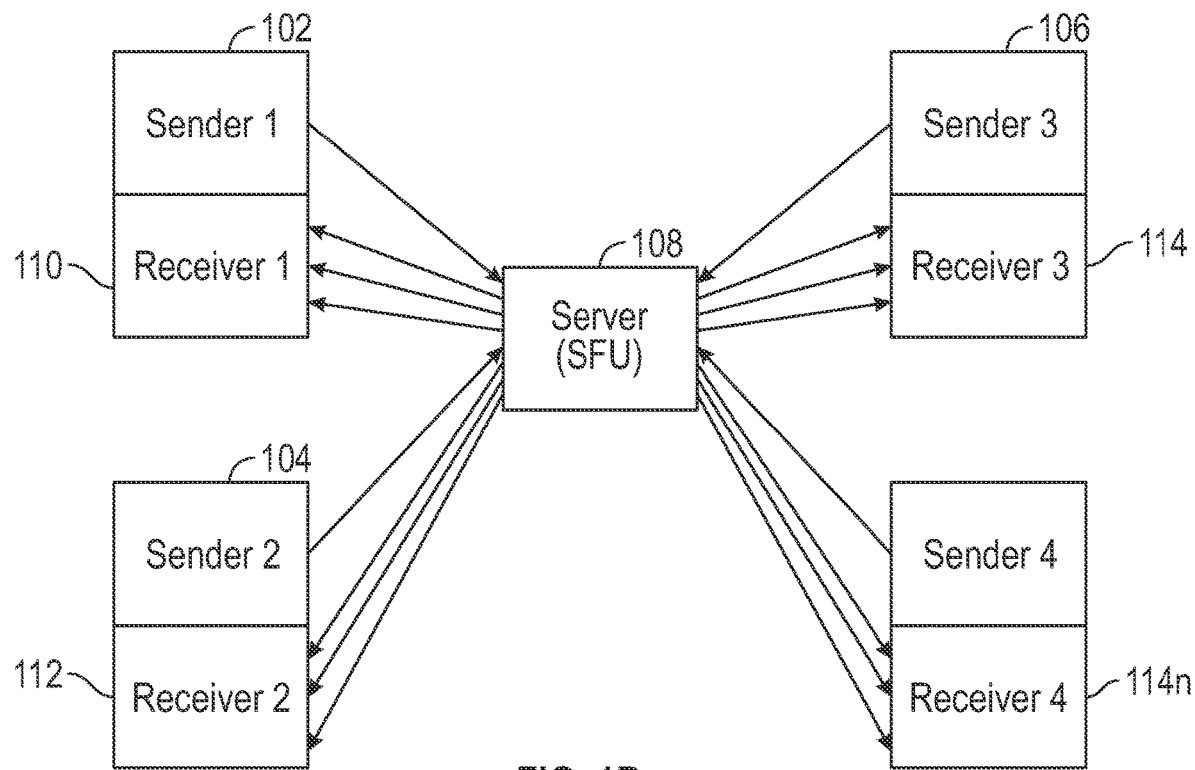
Figure 1C:
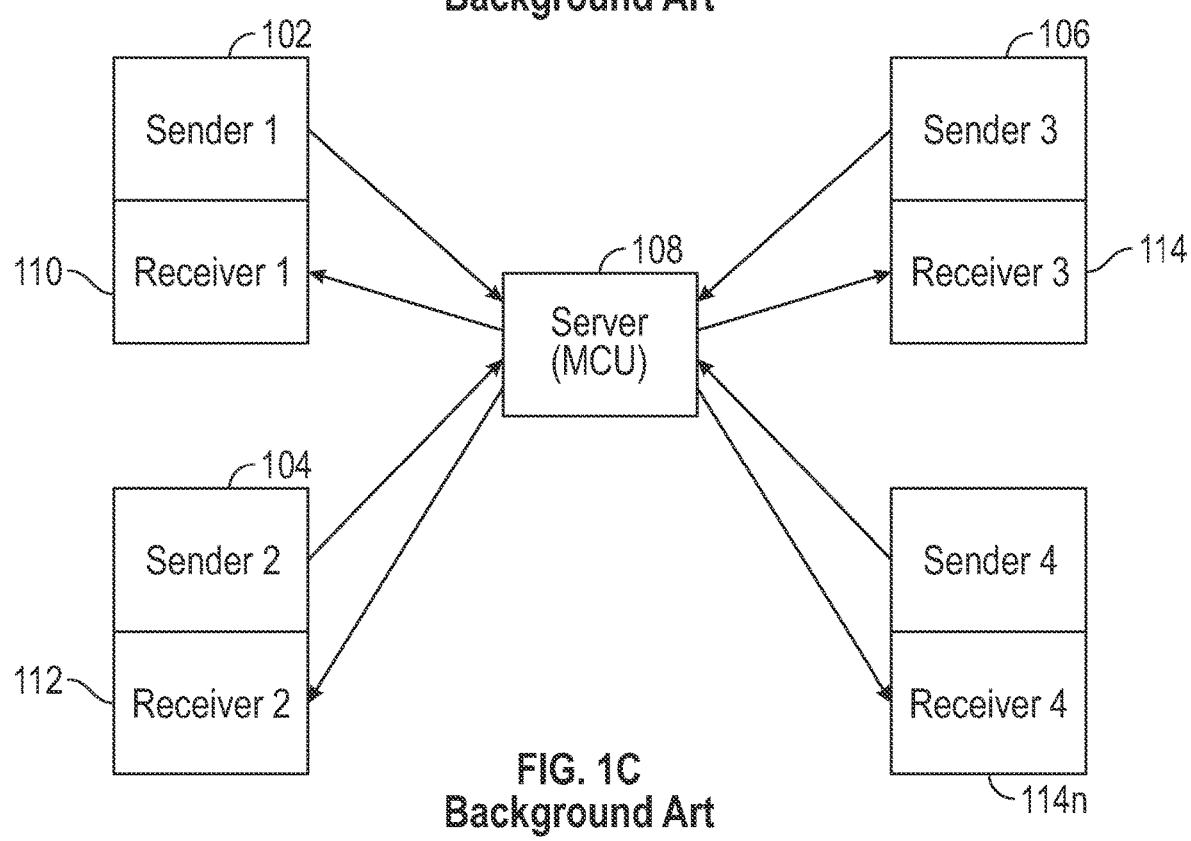

Because the first PRSA 220 only needs to send a single composed video feed 211 to each participant, the first PRSA 220 requires less networking resources compared to the server 108 of a background art video conferencing system as illustrated in FIG. 1. It can simultaneously provide a real-time full capacity of control of the composition, through programmatic means to the application embedded in the PRSA, without exceeding its processing and bandwidth limits.

In addition, if there is a need for multiple distinct rendered compositions to handle multiple parallel use cases it is possible for additional, PRSA units (e.g. 222) to also receive copies of the same sender video feeds 202A, 204A, 206A and to also generate a rendered composed media feed 211 that incorporates the sender video feeds 202A, 204A, 206A, as well as supplementary information and additional media effects. The additional PRSA 222 can then send the rendered composed media feed 211 to any further set of receiving participants that may or may not include participants from the first PRSA.

Figure 2B:
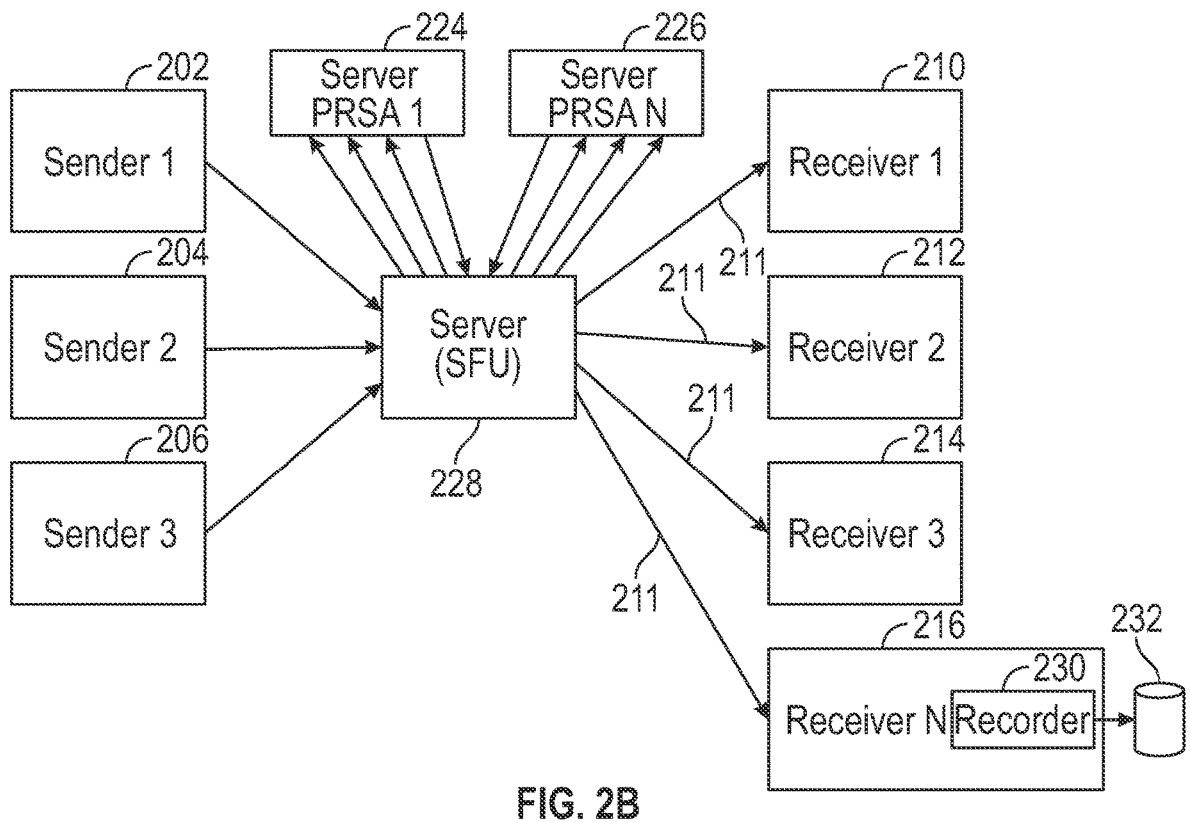

In some embodiments, the PRSA units may be resident on the same server 208. In alternate embodiments, the PRSA units could be resident on one or more additional servers, containers, or virtualized machines, as depicted in the architecture of FIG. 2B. Specifically, 1→N real-time communications can occur with multiple PRSA units (e.g. 224, 226) each deployed on their own servers, containers, or virtualized machines.

The real-time media communications system architecture illustrated in FIGS. 2A and 2B where one or more PRSAs receive and/or process multiple sender media feeds, generate a single rendered composed media feed, and send the single composed media feed to multiple real-time media communication participants, makes it possible to support the receipt of a large number of sending participants even on receiving endpoints and/or connections with very few resources available to them, as it is also known in the art of MCUs applications.

FIG. 2B shows an alternate method of conducting a real time media communications session where instead of the PRSA (224, 226) sending a copy of the composed media stream to each receiver, it sends the stream once only to a Media SFU unit (228), the SFU then forwards the media stream to selected receivers. In some embodiments the PRSA unit (224, 226) will send multiple copies of the stream with different spatial and/or temporal characteristics to the SFU (228). The SFU can then forward the most appropriate version of the composed media stream to each receiver, thus enabling a better experience for the receiving endpoint (e.g. 210, 212, 214, 216) and making it possible to receive even on a low powered device by electing to receive a smaller resolution or lower framerate version of the composed media stream coming from the PRSA unit(s).

Figure 2C:
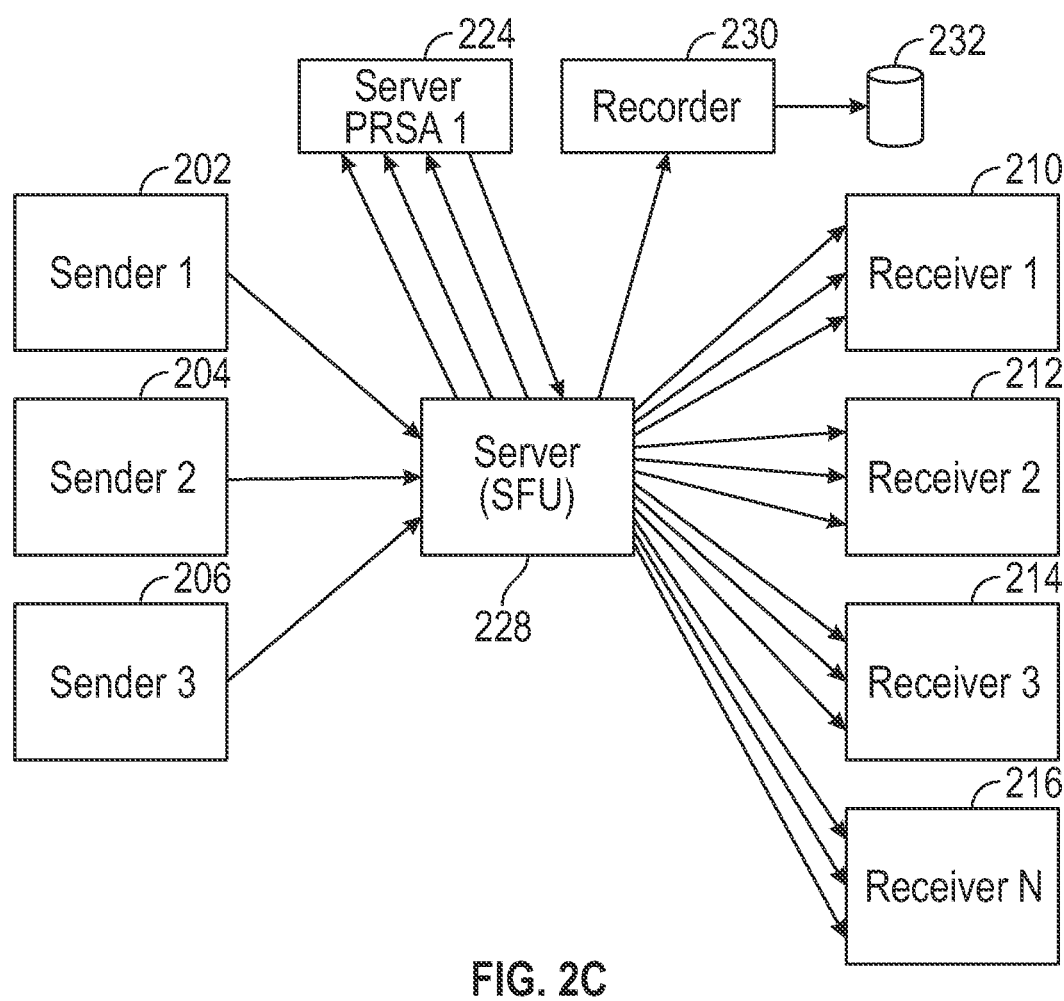
Figure 2D:
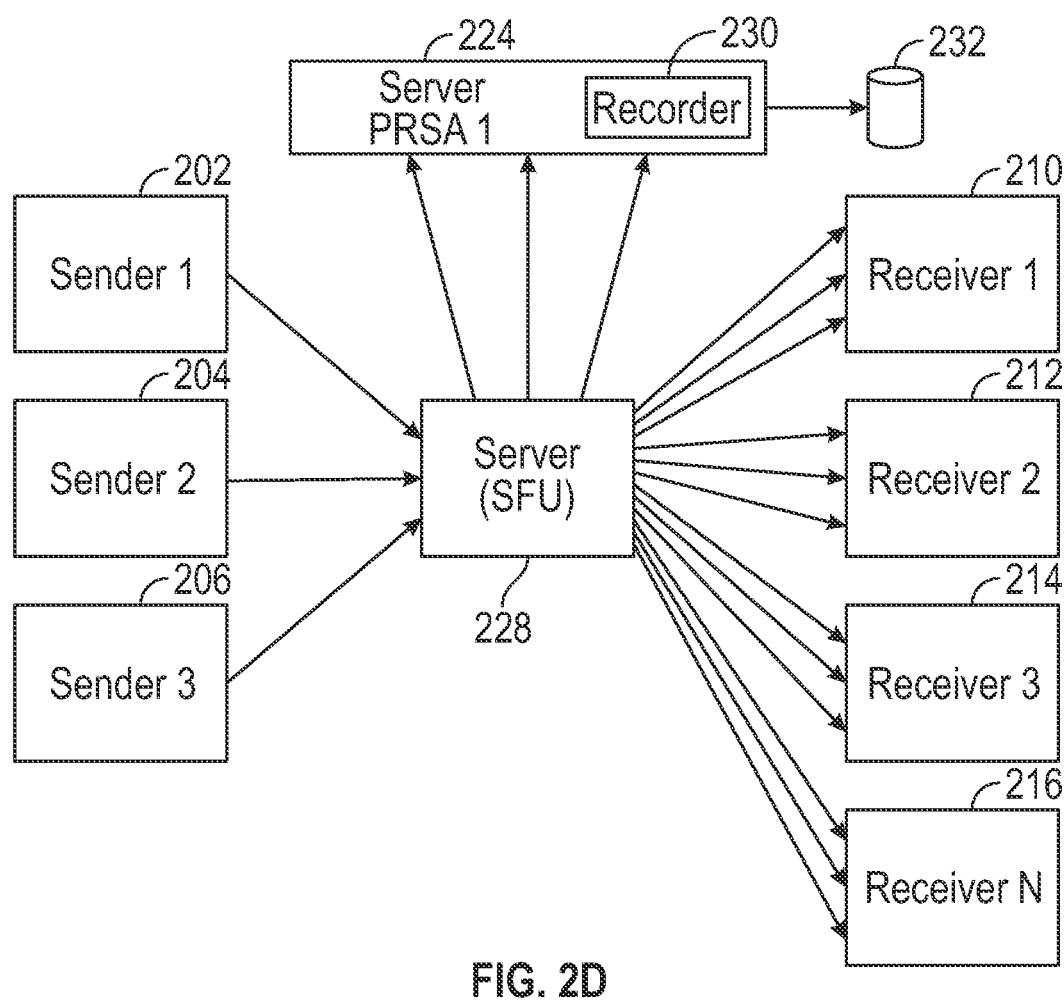
Figure 2E:
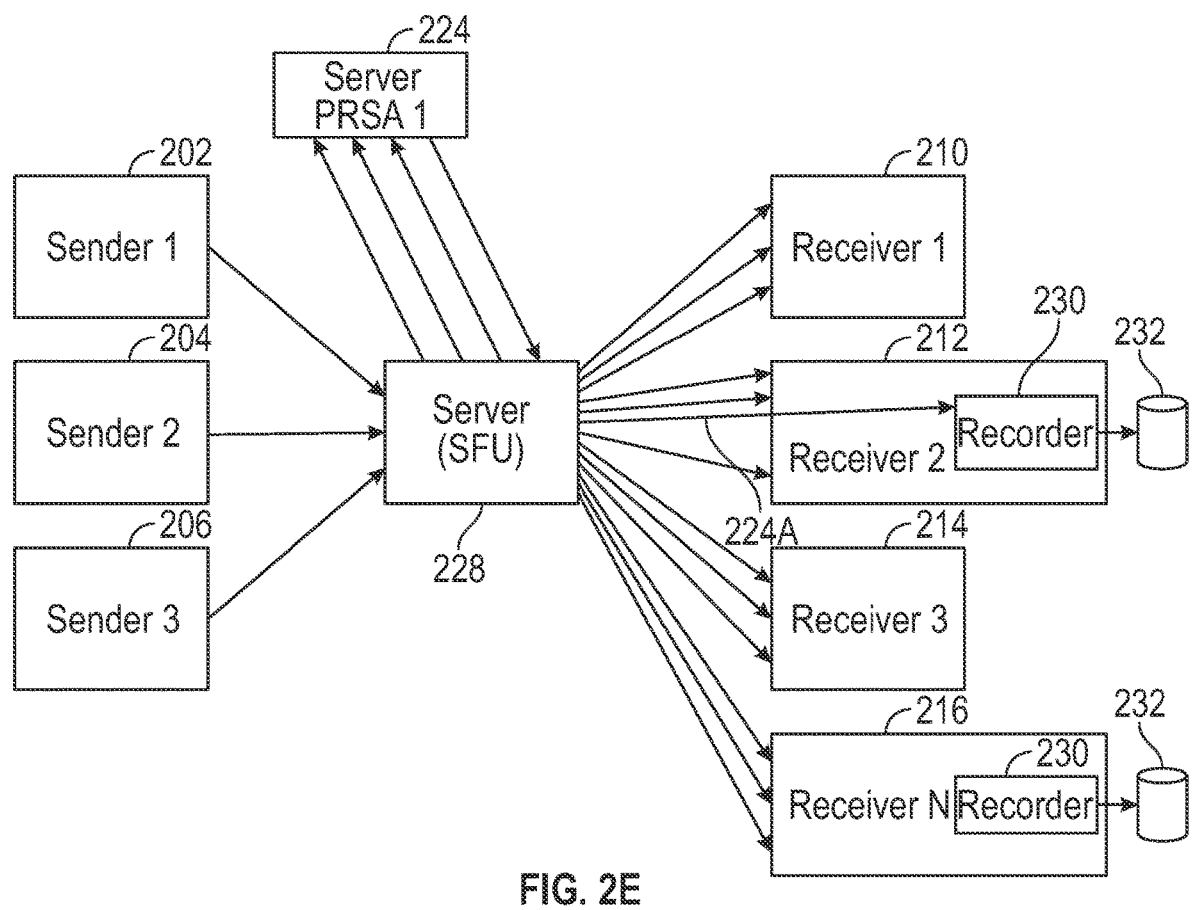

In some embodiments a Recording Unit (230) with an associated Storage Unit (232) could be used to capture the composed media feed and store in the associated Storage Unit (232), which could be local or remote. This Recording Unit (230) could be embedded in a Receiver (216). In this case the Receiver (216), if network and computational resources allow, can request the highest quality version of the stream produced by the PRSA (e.g. 224) from the SFU (228) in order to record that on the integrated Recording Unit (230). Alternatively, the best possible quality following networking and/or computational resources would be recorded. In other embodiments the Recorder (230) and its storage unit (232) could be local to the PRSA (224) as shown in FIG. 2D. In this case the composed media stream is not required to be sent to the SFU (228) for forwarding to the Receivers (210, 212, 214, 216) for recording purposes but is instead routed to the Recording Unit (230) directly. FIGS. 2C, 2D and 2E depict that PRSA composed media may just be used for specific uses within a session, while remote endpoints receive individual streams from the SFU for maximum flexible per-client experience. In another embodiment, rather than being integrated into a specific Receiver (216), the Recording Unit (230) is deployed on a dedicated server, container or virtual machine and receives the stream from the SFU (228) in a similar fashion to the other Receivers which receive streams (210, 212, 214, 216) as shown in FIG. 2C. The composed stream from PRSA received by the recording unit may or may not be received by the endpoint receivers (210, 212, 214, 216), since it is possible endpoint receivers can leverage the capacity to receive individual streams for best flexibility if network resources allow, while PRSA composed stream is used within the real-time communications session for specific purposes like recording of a complex composed experience, or other purposes like delay-tolerant broadcasting such as HLS transmissions, etc.

FIG. 2D the recording Unit (230) could be using a specific stream received especially for the purpose of recording while the user of the Receiver (216) is viewing a different experience based on the individual streams forwarded by the SFU (228) from each of the senders (202, 204, 206), but not necessarily including the stream generated by the PRSA (224).

Figure 3A:
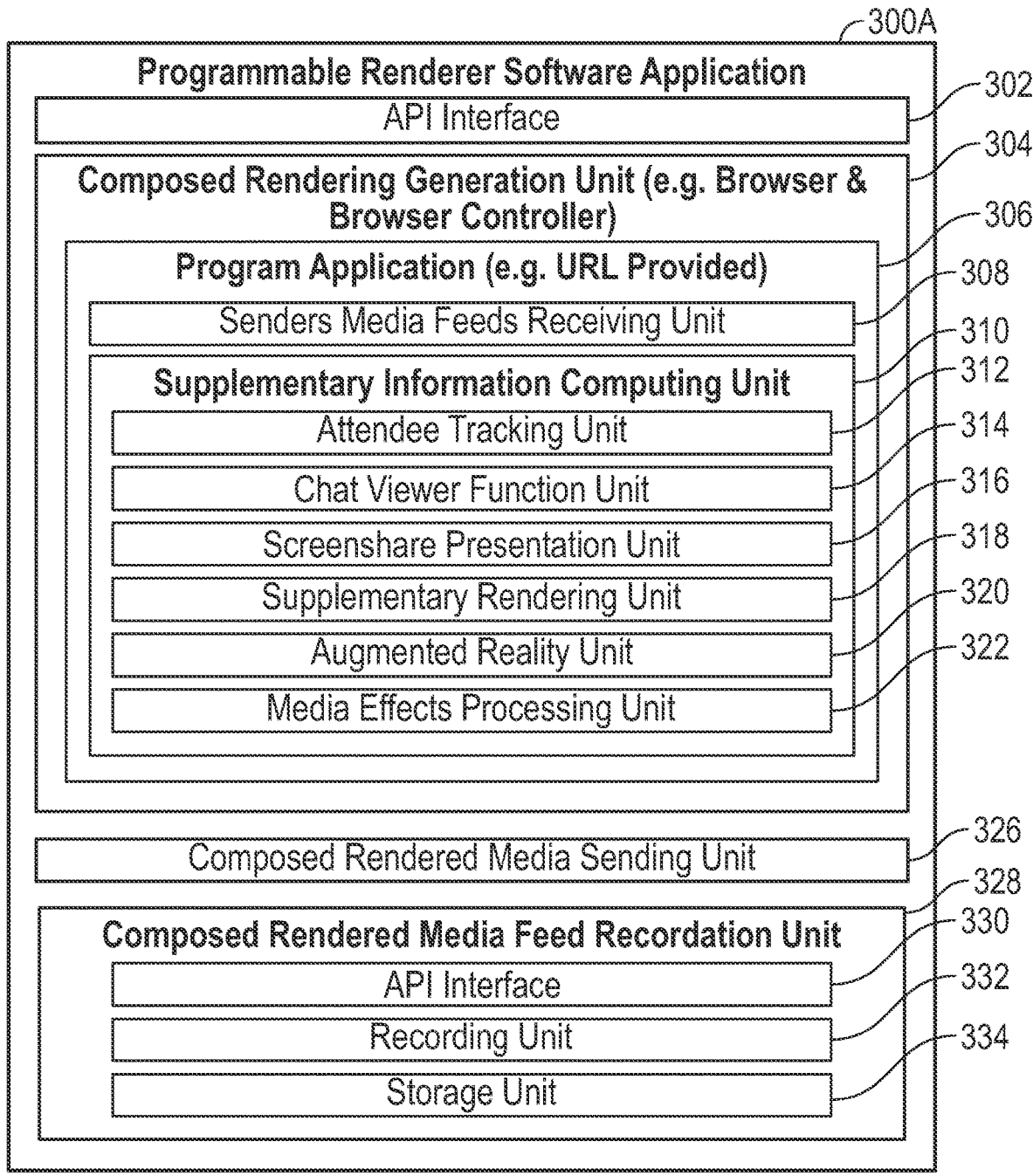
FIGS. 3A and 3B are diagrams of selected elements of real-time media communications (such as a video conferencing) software applications embodying the invention.
Figure 3B:
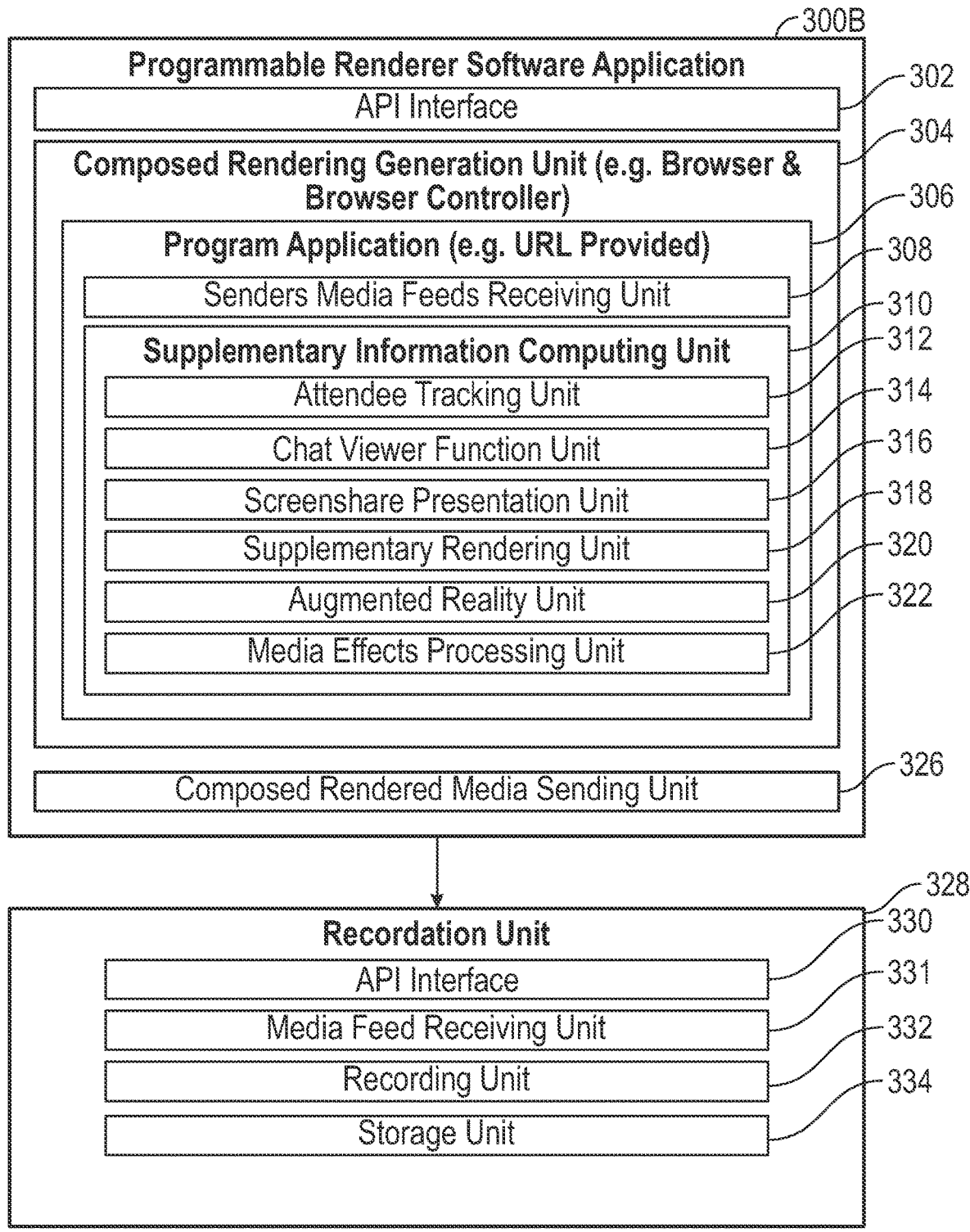

FIGS. 3A and 3B illustrate elements of programmable renderer software applications (PRSA) 300A and 300B that could be resident on a server 208 as illustrated in FIG. 2 to perform the functions described above. Two embodiments are depicted as 300A and 300B respectively and the details of each are discussed in greater detail below.

The PRSAs 300A and 300B include a sender participant media feed receiving unit 308 that receives media feeds from multiple media communications sender participants. This could be accomplished by establishing a first media communications session between the PRSA 300 and the sender participants.

The PRSAs 300A and 300B also include a Composed Rendering Generation Unit 304 that programmatically mixes the sender media feeds and may also incorporate various items of supplementary information in the participant media feed based on information received from a supplementary information unit 310, as discussed below. The composed media feed may be then sent to each of the media communications participants.

In some embodiments, the PRSAs 300A and 300B may be involved in a real-time media communications session with just the real-time media communications participants, in which the composed media feed is sent to the computing devices of each of the real-time media communication participants. Various items of supplementary information may be sent from the participants to the PRSAs 300A and 300B as part of that real-time media communications session, including text or chat messaging, screen sharing information, and possibly a composed video feed.

The PRSAs 300A and 300B may be connected through a separate real-time media communications session with the sending participants. Thus, the receiving participants and the sending participants may be connected through a separate real-time media communication session. In the real-time media communications session established between the sending participants and the PRSA 300A/300B, the sending participants are sending media feeds and possibly supplementary information such as screen sharing information, or additional metadata with application information to the PRSA 300A/300B. The PRSA 300A/300B also includes a supplementary information unit 310 which is responsible for obtaining, gathering, formatting and tracking a variety of supplementary information that could be rendered and presented to the real-time media communication participants (sending and/or receiving participants). To that end, the supplementary information unit 310 could include an attendee tracking unit 312 that tracks who was invited to attend the real-time media communications, who is currently attending the real-time media communications session, as well as other attendee-specific information, or any programmatically renderable information or media effect, or application part. For example, the attendee tracking unit 312 could track whether a particular attendee is receiving and using audio and video in the real-time media communications session, or only audio or a real-time processed insertion of information as an augmented reality component to the media information from the real-time media communications session.

The supplementary information unit 310 also may include a chat function unit 314 that allows senders and/or receiving participants to type text messages or questions that are seen by all real-time media communications participants or which are only seen by specific attendees. For example, the chat function unit 314 could allow a first participant to set up a private chat session with a second participant, in which case only the first and second participants would see the text messages passing back and forth between the two participants. Also, the chat function unit 314 could allow all media conference participants to type in questions, but where the questions are only seen by the senders, allowing the senders to control which questions are raised and answered during the media conference. The PRSA can then programmatically select any of the information of the chat available, either the information visible to all, or the one specific to some participants and render it at will, based on the specific use case designed by the PRSA.

The supplementary information unit 310 could further include a screen sharing presentation unit 316 that allows a sender and/or receiving participant to share what is shown on their computing device display screen with other video conference participants. The shared screen could appear in the center of the composed video feed or in a smaller window that appears in the composed video feed, or any-where desired as per the PSRA programming, even including the mixture of additional media effects on it.

The supplementary information unit 310 could further include a supplementary rendering unit 318 that generates supplementary media feed data incorporating one or more items of supplementary information. The supplementary rendering unit 318 then sends the supplementary media feed data to the Composed Rendering Generation Unit 304 so that the supplementary information can be incorporated into the composed media feed.

The above description only covers some of the elements that could be included in a supplementary information unit 310. A supplementary information unit 310 embodying the invention could include additional units to track and format other forms of supplementary information (e.g., an Augmented Reality Unit (320) that could be used among other things, to incorporate elements of AR/VR experiences to the composed media stream, e.g. a virtual meeting place with 3D avatars). It could also have a Media Effects Processing Unit (322) capable of adding special media effects to the composed media stream, for example, and not limited to, animating time-synced emoji reactions from participants in a video conference, or additional audio effects, etc. Likewise, a supplementary information unit 310 embodying the invention need not include all the items discussed above.

The PRSA 300A illustrated in FIG. 3A rendered composed media feed can be alternatively or complementary used as a feed for a recordation unit 328 that is responsible for creating a recording of a real-time media communications. In some embodiments, and most commonly, a separate recording API running on the same server 208 that is processing the various video feeds or in a different server may be responsible for generating a recording of a real-time media communications session. In that instance, the media feed recording unit could include an API interface 330 configured to interact with the recording API. In some embodiments, such as the one 300B illustrated in FIG. 3B, the API interface unit 330 could route the rendered composed media feed that includes supplementary information to the recording unit, by way of the Media Feed Receiving Unit 331, and sent from the Composed Rendered Media Sending Unit 326, so that the recording unit can make a recording of everything included in the rendered information by the PRSA, much richer than the bare combination of media feeds from sending participants. In other embodiments, such as the embodiment 300A illustrated in FIG. 3A, the media feed recordation unit 328 may itself be configured to make a recording of real-time media communications. In that instance, the Composed Rendered Media Feed Recordation Unit 328 can receive the composed media feed directly from the Composed Rendering Generation Unit 304 without the overhead of additional protocols & packaging required to send the media over a network. The API interface 330 provides an API which can be used to interface with the Recording Unit 332 to control the recording of the composed media. In some embodiments, a storage unit 334 of the video feed recordation unit 328 causes the rendered composition media feed to be recorded on a local data storage device of the server upon which the PRSA 300A/300B is running. In other instances, the recording can be caused to be stored at a remote location, such as on a cloud storage or network unit, but not limited thereto.

The recording unit 328 may be running on the server upon which the PRSA 300A/300B is running. Alternatively, the recording unit 328 could be running on a separate computer, server, cloud server, or a virtual computer or virtual server running in the cloud. Regardless, the recording unit is configured to record the audio of the rendered composed media feed along with the rendered video composed media feed, as opposed to a separate audio track that may be generated by the computer or server upon which the recording unit is running.

The Composed Rendering Generation Unit (304) can be implemented by means of a browser (or other software capable of rendering a web application at a given URL). The operation of the Composed Rendering Generation Unit 304 is controlled via the API Interface 302 which causes it to navigate to a URL at which to find the application capable of generating and controlling the composed rendering of the PRSA. This is the Program Application 306. The same API interface then causes the Composed Rendered Media Sending Unit 326 to begin to capture the media data from the Composed Rendering Generation Unit 304. In some embodiments 300A, such as the one illustrated in FIG. 3A, media gets muxed and routed directly to the recordation unit 328 from the Composed Rendering Generation Unit (304) on the same machine. In other embodiments 300B, such as the one illustrated in FIG. 3B, the media gets muxed and prepared for sending over the network by means of the Composed Rendered Media Sending Unit 326 (adding the required encoding, protocols & packaging, including but not limited to, as an example, VP8, H264, OPUS, tcp/ip, udp, rtp, rtcp, etc.) to a remote recordation unit 328. In the embodiment 300B illustrated in FIG. 3B, the Remote Recordation Unit 328 contains a Media Feed Receiving Unit 331 which receives the possibly composed, encoded and packetized media feed being sent from the remote Composed Rendered Media Sending Unit 326, and proceeds to depacketize and decode and prepare as needed for the recording process 332 into to the Storage Unit 334. In another embodiment, instead of the Remote Recordation Unit, there might be in place broadcast unit of the composed media feed via RTMP(s) or distribute it as HLS or forward the stream via SIP Gateways or other RTC technology. The media generated by the Composed Rendered Media Sending Unit 326, may be also transmitted (e.g. 211) to Receiving endpoints 210, 212, 214, 216 and/or other functional units from a real-time media communications platform for further processing and/or use, such as SIP Gateways, or other RTC technology as depicted further in FIG. 9 and FIG. 10.

Figure 11:
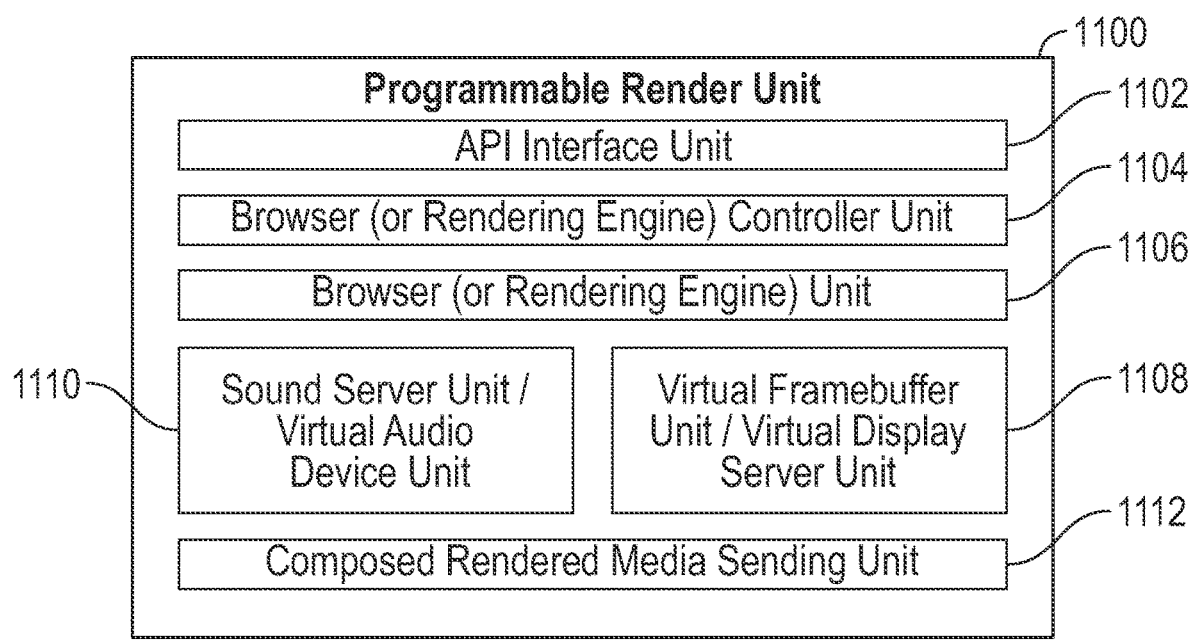
FIG. 11 is a diagram of the components embodying a Programmable Renderer Unit in accordance with the subject invention.

FIG. 11 shows a physical representation of the Programmable Renderer Software Application as described in 300A & 300B. The Programmable Renderer Unit 1100 contains an API Interface Unit 1102 which allows programmatic control over the rendering and publishing of a composed media stream. When a request to begin to produce the composed media stream arrives at the API Interface Unit 1102 it delegates control over the rendering to the Rendering Engine Control Unit 1104 and control over the publishing of the composed media stream to the Composed Media Sending Unit 1112. The Rendering Engine Control Unit 1104 passes a URL to the Rendering Engine Unit 1106 which loads the Program Application 306 with all of the Senders media, or any subset of them, 308 and supplementary information 310. The Rendering Engine Control Unit 1104 is configured to output audio and video streams, respectively to the Virtual Audio Device Unit 1110 and to the Virtual Display Server Unit 1108. The Composed Media Sending Unit 1112 reads data from the Virtual Audio Device Unit 1110 and the Virtual Display Server Unit 1108, muxes it and serializes it appropriately for output. In some embodiments of the PRSA 300B, such as the one illustrated in FIG. 3B, this could involve preparing the data to be sent over the network. In other embodiments 300A, such as the one illustrated in FIG.

3A, it could be serialized more simply for consumption by another component on the same server. In other embodiments, other same-server components can consume directly media data from the Virtual Display Server Unit 1108 and/or Virtual Audio Device Unit 1110.

Figure 9:
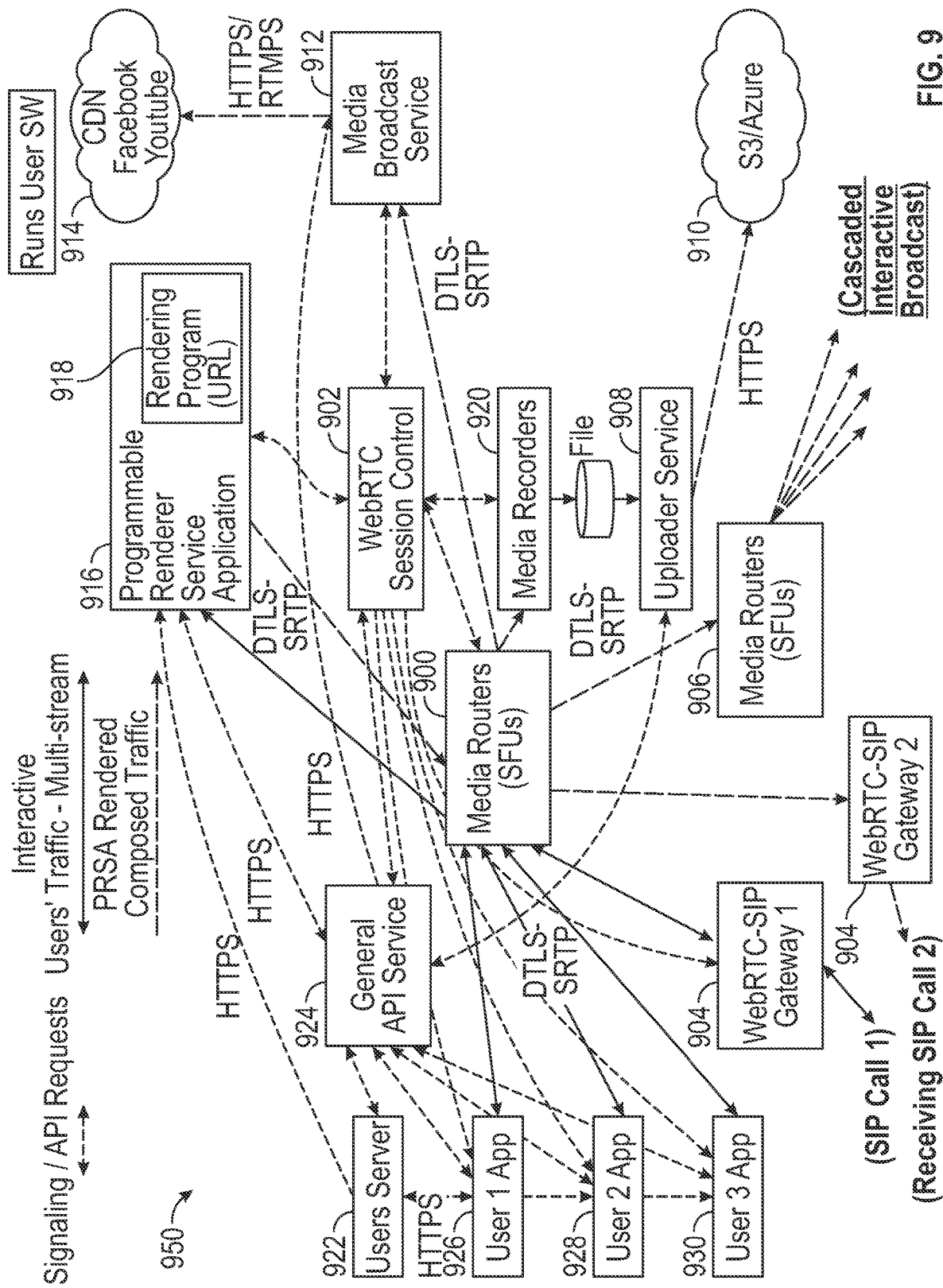
FIG. 9 is a diagram of selected elements of a real-time media communications platform embodying a Programmable Renderer Service Application in accordance with the subject invention for generating rendered composed media feed.
Figure 10:
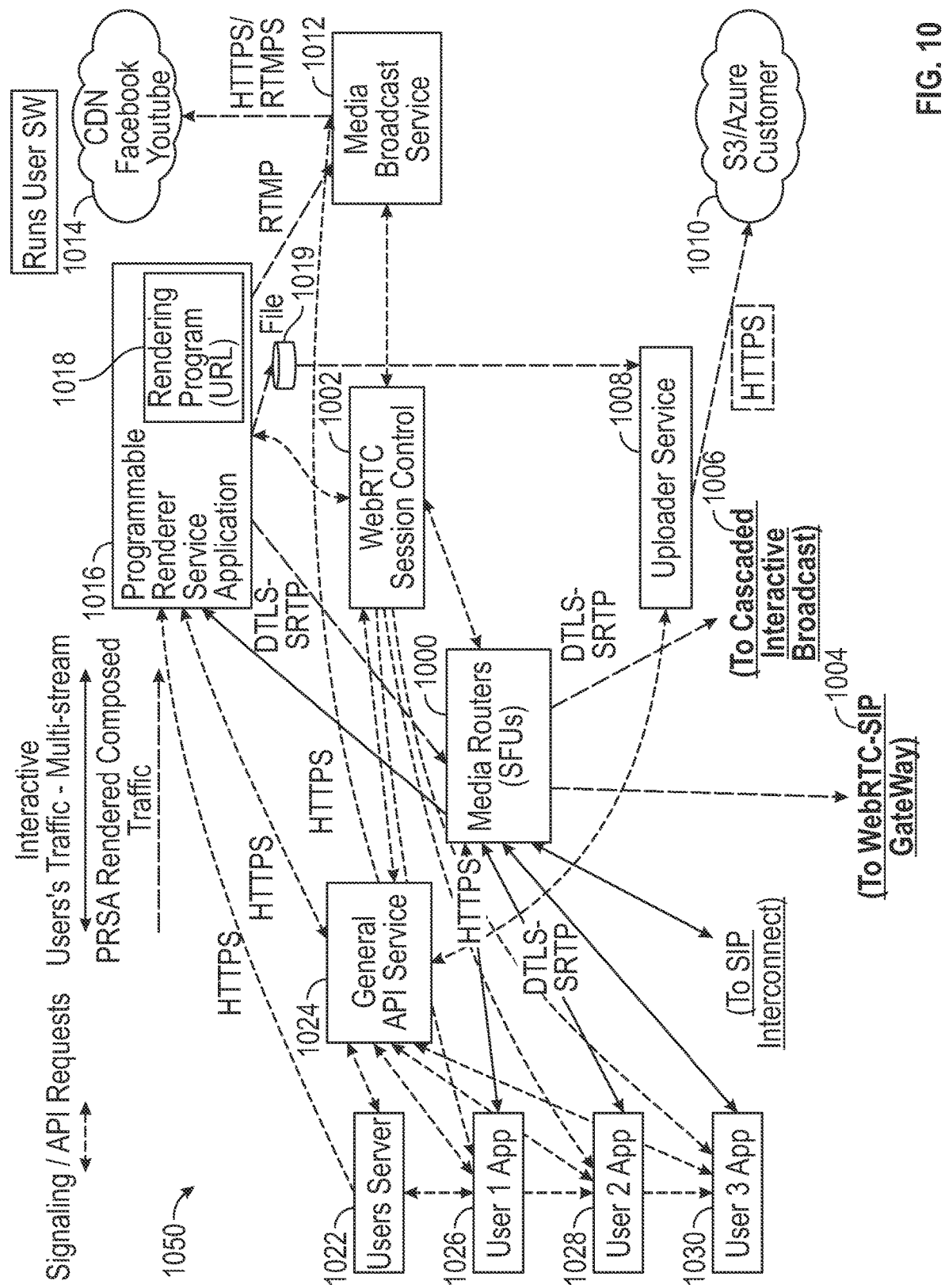
FIG. 10 is a diagram of selected elements of a real-time media communications platform system embodying a Programmable Renderer Service Application in accordance with the subject invention, where the Programmable Renderer Service is able to directly record or interconnect directly with a broadcasting service.

FIG. 9 and FIG. 10 depict how the Program Application 306 of the PRSA 300A/300B as shown in FIGS. 3A and 3B are provided by customer infrastructure 922, 1022. This construction gives the customer/user control over the sender media and supplementary information controlled by units 308 and 310 respectively. The sender media and supplementary information is derived from the Rendering Program 918, 1018 hosted on customer infrastructure and accessible at the URL provided by the customer/user, and incorporated into the composed rendered media stream as output by the Composed Rendered Media Sending Unit 326 and encapsulated in the PRSA 916, 1016 as deployed in the cloud platform. In general, the customer infrastructure communicates with the Platform API Gateway 924, 1024. It uses this API to start to render the composed media feeds with the PRSA 916, 1016 and to interact with platform services in general, e.g. create a real time communication session with multiple participants logged into different user applications (e.g. 926/1026, 928/1028, 930/1030, etc.) or start recording to disk 920 or broadcasting or using SIP 904.

Figure 4:
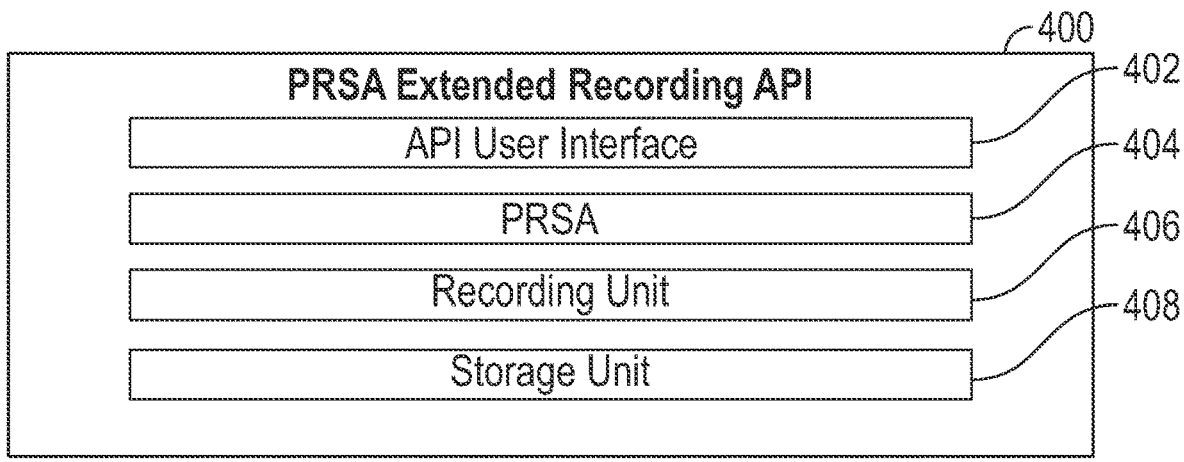
FIG. 4 is a diagram of selected elements of a real-time media communications, e.g. a video conference, recording application programming interface embodying the invention.

In a possible embodiment, FIG. 4 illustrates elements of a real-time media communication, such as a Video Conference Recording Application Programming Interface (API) 400 configured to record a real-time media communication. The API 400 could be used by an application, service or system controlling the real-time media communication session to generate a recording of the real-time media communication. Alternatively, the API could be used by elements of a video conferencing software application in an endpoint.

The API 400 includes a user interface 402 that is configured to interact with an agent aiming at using and/or controlling it. The user interface 402 would receive a request to generate a recording from a user agent. That request could include a URL at which the application forming the PRSA is available. Complementarily, the request could identify the realtime media communications to be recorded, or a location at which the recording should be delivered and/or uploaded via some alternate form of identifying information.

The API 400 also includes a programmable renderer software application (PRSA) unit 404 to generate a rendered composed media feed as described previously in the PRSA 300A/300B. The PRSA unit 404 would receive a request to generate a rendered composed media feed from the user interface of the API 402. The PRSA interface 404 would receive a URL from the user interface of the API 402 indicating the software application that programmatically defines how the rendered composed media feed is of the real-time media communications to be recorded.

The API 400 also includes a recording unit 406. The rendered composed media generated by the PRSA Unit 404 can be routed to the Recording Unit 406 in a number of ways and as described above (FIGS. 2A-2E and 3A and 3B). Once instantiated, the recording unit 406 causes a recording of the rendered composed media feed to be recorded at a specific storage location.

In some embodiments, a storage unit 408 of the API causes the rendered composed media feed to be recorded on a local data storage device of the server upon which the API 400 is running. In other instances, the recording unit 406 could cause the recording to be stored at a remote location, such as on a cloud server or network storage. A request to record a real-time media communications received via the user interface 402 could specify the location at which the recording of the real-time media communications session is to be stored.

The software application that is instantiated through the URL mentioned above and run by the PRSA may be running on the server upon which the API 400 is running. Alternatively, the software application, and the PRSA, could be running on a separate computer, server, cloud server, or a virtual computer or virtual server running in the cloud. Regardless, the software application is configured to render composed media from any of the participants media feeds along with the additional information and media effects, as defined within the program of the PRSA from the loaded URL. A real-time media communications recording API 400 embodying the invention could have elements in addition to those discussed above. Likewise, a realtime media communications recording API 400 embodying the invention need not include all of the features discussed above.

FIG. 9 and FIG. 10 depict two different embodiments of the invention as they might be implemented within a larger media cloud platform (950 and 1050 respectively) for real-time communications. Without loss of generality, such a platform 950/1050 may be based, in an embodiment of this invention, on WebRTC technologies. In FIG. 9, the Media Routers (SFUs) backbone 900, 902 of the communications platform 950 forms a central hub which can be scaled horizontally and independently of the other services which communicate with it. The SFUs 900 (and associated Session Control Units 902) forward data to additional platform modules for dedicated processing to fit a particular purpose (e.g. including but not limited to SIP Gateway 904, Media Recorders 920 for further processing by an Uploader Service 908 which outputs the processed data to a configurable remote storage location 910 for subsequent distribution, Media Broadcast Service 912 for further processing and distribution over Content Distribution Networks (CDNs) and other downstream media systems 914 and an embodiment of the PRSA 916 under discussion. The SFU 900 and associated Session Control Unit 902 can also be scaled horizontally (shown as additional SFUs 906) at runtime to meet the demands of a very large real time interactive communication session (i.e, a Cascaded Interactive Broadcast). This is achieved by balancing the participant media processing between multiple connected pairs of SFU Units 900 with their associated Session Control Units 902.

FIG. 10 depicts an alternative topology for the communications platform using different embodiments of the present invention as discussed above. Similar to platform 950, platform 1050 includes SFUs 900 and associated Session Control Units 902 to forward data to additional platform modules for dedicated processing to fit a particular purpose. In this case, the PRSA unit 1016 will not route the composed media stream via the SFU 1000 for certain services but rather route them directly to the intended recipient. The PRSA unit 1016 sends the composed media stream directly to an integrated recording unit for recording to the associated storage unit. The output is a media file 1019 which is delivered to an Uploader Service 1008 for further processing and delivery to a configurable remote storage location 1010 for subsequent distribution. The PRSA unit 1016 also sends the composed media feed directly to the Broadcast Unit 1012 for further processing and distribution over Content Distribution Networks (CDNs) and other downstream media systems 1014. In this way, certain functionalities are tightly coupled to the PRSA unit 1016, which distinguishes this embodiment from that shown in FIG. 9, which is more modular with the SFU 900 and associated Control Unit 902 routing the media between the different platform components for a given real time media communications session.

Figure 5:
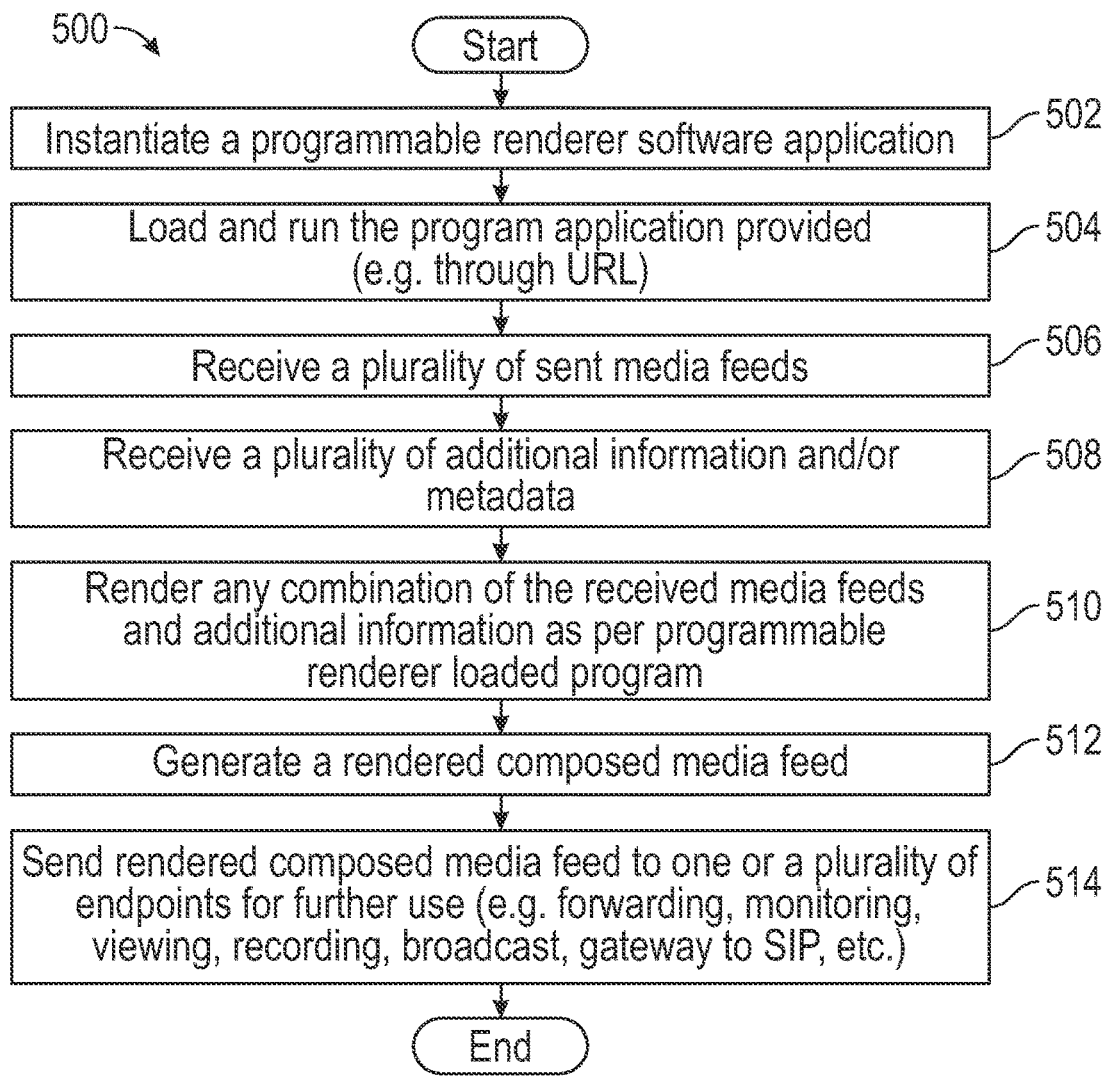
FIG. 5 is flowchart illustrating steps of a first method of providing real-time media communications services embodying the invention.

A method of providing Programmable Renderer services within a real-time media communications system or platform that would be performed by elements of a PRSA 300 is illustrated in FIG. 5. The method 500 begins and proceeds to step 502 where a PRSA 300A/300B is instantiated on a server. A software application to be executed by the PRSA is loaded and then run on the server at step 504 (in an embodiment of the invention, the application can be received through the API controlling the PRSA by means of a URL-Uniform Resource Locator-, aka web address). In step 506, a Senders Media Feeds Receiving Unit 308 of the PRSA 300A/300B receives one or more sender media feeds of a real-time media communications session. In step 508, supplementary information and/or metadata, which may or may not be about or occurring within the real-time media session, is received in a supplementary information unit 310 of the PRSA 300A/300B. In step 510, a Composed Rendering Generation Unit 304 of the PRSA 300A/300B uses the received sender media feeds and/or supplementary information to render a combination of media according to application loaded in step 504, followed by step 512 where rendered media is adapted and composed for consumption, according to media format requirements by any further processing steps as a single composed media feed also done by the Composed Rendering Generation Unit 304. In step 514, the generated rendered composed media feed would then be sent to or made available for further processing or use in a real-time communication system, such as for at least one of a sending it to one or more participants, one or more media recorders, a broadcasting system, a gateway to SIP connections, AI analysis system, etc. via the Composed Rendered Media Sending Unit 326.

Although the depiction of this method 500 in FIG. 5 illustrates these steps occurring in a sequential fashion, in fact steps 504-514 would be executing simultaneously, and often in concurrence, as part of a media processing pipeline of steps and processing units, while the real-time media communications session occurs. When the real-time media communications session terminates, the method ends. Without loss of generality, the method may be started and/or terminated at any time of the real-time media communications sessions, following the needs of the specific use case the PRSA is used at a given point in time.

The method 500 depicted in FIG. 5 could be the first time that a PRSA 300A/300B is instantiated and used to provide programmable renderer services to a real-time media communications session. Alternatively, if a first PRSA 300A/300B has been instantiated and is in the process of providing programmable renderer services, and a new functionality or application configuration is required, distinct to the one being handled by the first PRSA in the real-time communications session, the method illustrated in FIG. 5 could be performed to instantiate a second PRSA 300A/300B that provides essentially an additional Programmable Renderer service to the same real-time media communications session as the first PRSA 300A/300B, but for a different rendered media result, such as with the purpose of handling different needs to a different plurality of participants, or implementing a different functionality and/or use case.

As also mentioned above, step 506 of method 500 could involve the PRSA 300A/300B receiving through a first real-time media communications session from the media senders (e.g. sending participants in a video conference) to obtain the sender media feeds and to provide these same sending participants with supplementary services. As part of a first real-time media communications session, the PRSA 300A/300B could also provide the composed media feed back to the senders. Step 514 could involve the PRSA 300A/300B transmitting through a second different real-time media communications session with receiving participants to provide the participants with the composed media feed and to provide supplementary services to the participants. The same applies to any receiving communications agent capable of receiving and using the rendered composed media feed to provide supplementary services, such as recording, broadcast, gateway to SIP communications, etc.

Figure 6:
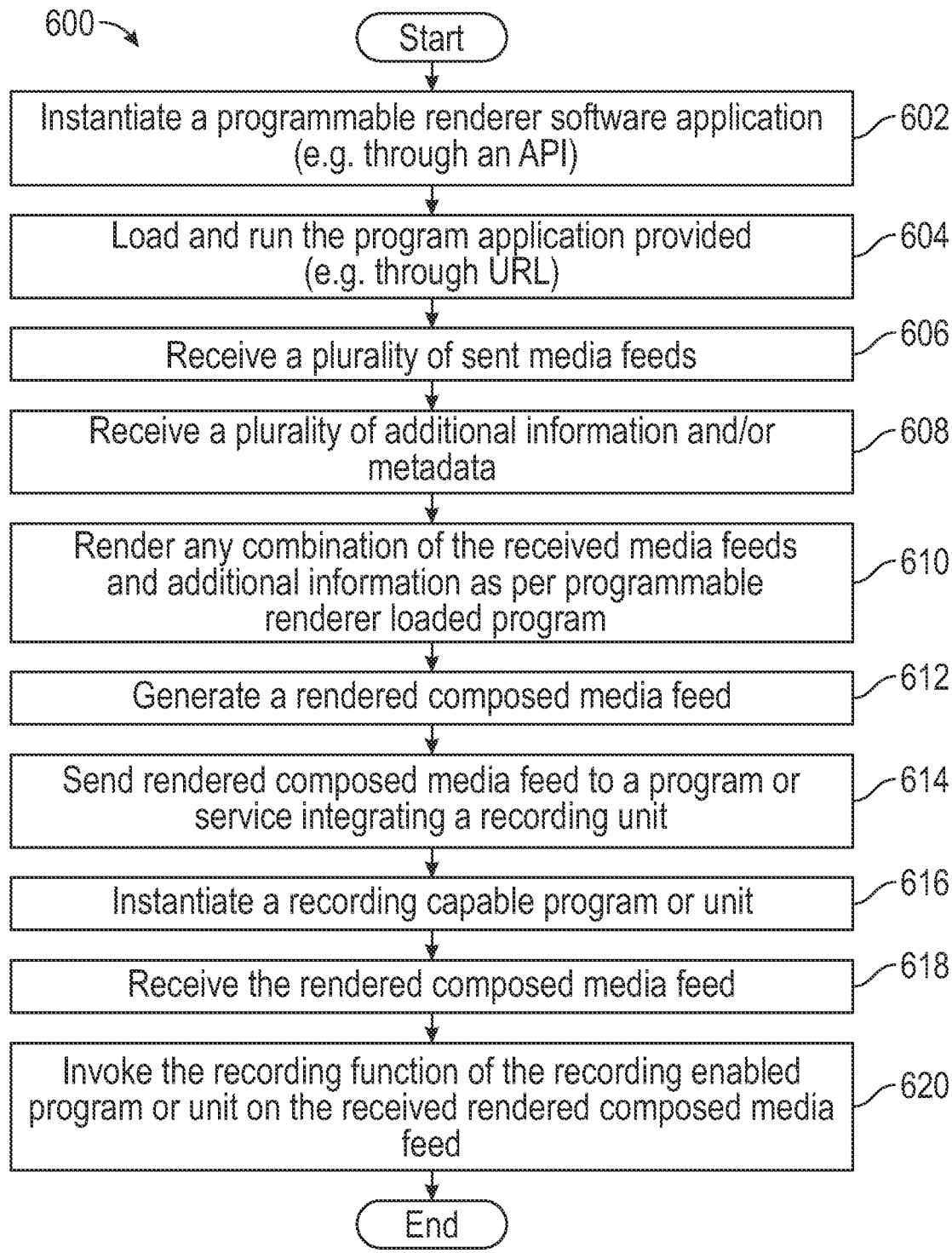
FIG. 6 is a flowchart illustrating steps of a second method of providing real-time media communications services embodying the invention.

FIG. 6 illustrates method steps of a second method 600 of providing realtime media communications services including a Programmable Renderer Services Application. In this second method 600, the realtime media communications services include recording the realtime media communications including additional information and media effects as can be performed by elements of a system described in FIGS. 3A and 3B.

The method 600 begins and proceeds to step 602 where a PRSA 300A/300B is instantiated on a server. A software application to be executed by the PRSA is loaded and then run on the server at step 604 (in an embodiment of the invention, the application can be received through the API controlling the PRSA by means of a URL-Uniform Resource Locator-, aka web address). In step 606, a Senders Media Feeds Receiving Unit 308 of the PRSA 300A/300B receives one or more sender media feeds of a real-time media communications session. In step 608, supplementary information and/or metadata, which may or may not be about or occurring within the real-time media session is received in a supplementary information unit 310 of the PRSA 300A/300B. In step 610, a Composed Rendering Generation Unit 304 of the PRSA 300A/300B uses the received sender media feeds and/or supplementary information to render a combination of media according to application loaded in step 604, followed by step 612 where rendered media is adapted and composed for consumption, according to media format requirements by any further processing steps as a single composed media feed also done by the Composed Rendering Generation Unit 304. In step 614, the generated rendered composed media feed would then be sent to or made available for further processing or use in a real-time communication system, such as for at least one of sending it to one or more participants one or more media recorders, a broadcasting system, a gateway to SIP connections, AI analysis system, etc via the Composed Rendered Media Sending Unit 326. In step 614, the composed video feed is sent to or made available to a program or service integrating a recording unit.

In step 616, a recording capable program or unit, such as the recordation unit 328 of the PRSA 300 is instantiated. In step 618, rendered composed media feed is received by the recordation unit. In step 620, the recording function of the recording enabled program or unit is invoked to cause the recording enabled program or unit to record the composed video feed, which includes the sender video feeds and supplementary information rendered by the PRSA according to the program loaded in step 604. The recording capable software application and/or recordation unit could cause the composed video feed to be recorded locally on the server upon which the PRSA 300A/300B is running, or on a remote or cloud server more devoted to the recording purpose.

Steps 604-614 and 618-620 would continue operation while real-time media communications proceed. Upon termination of the real-time media communications such as a video conference, the method 600 would end. Without loss of generality, method 600 can be started, paused and/or stopped through the progress of a real-time communications session without at any time allowing to create any number of recordings of a subset of the total length of media and/or additional information from the real-time media communications session. Note, it may also be possible for a system administrator and/or controlling program or service, to instruct the PRSA 300A/300B to pause and later resume recordation of the composed media feed. Likewise, it may be possible for a system administrator and/or controlling program or service, to terminate recordation of the composed media feed before the realtime media communication ends.

Figure 7:
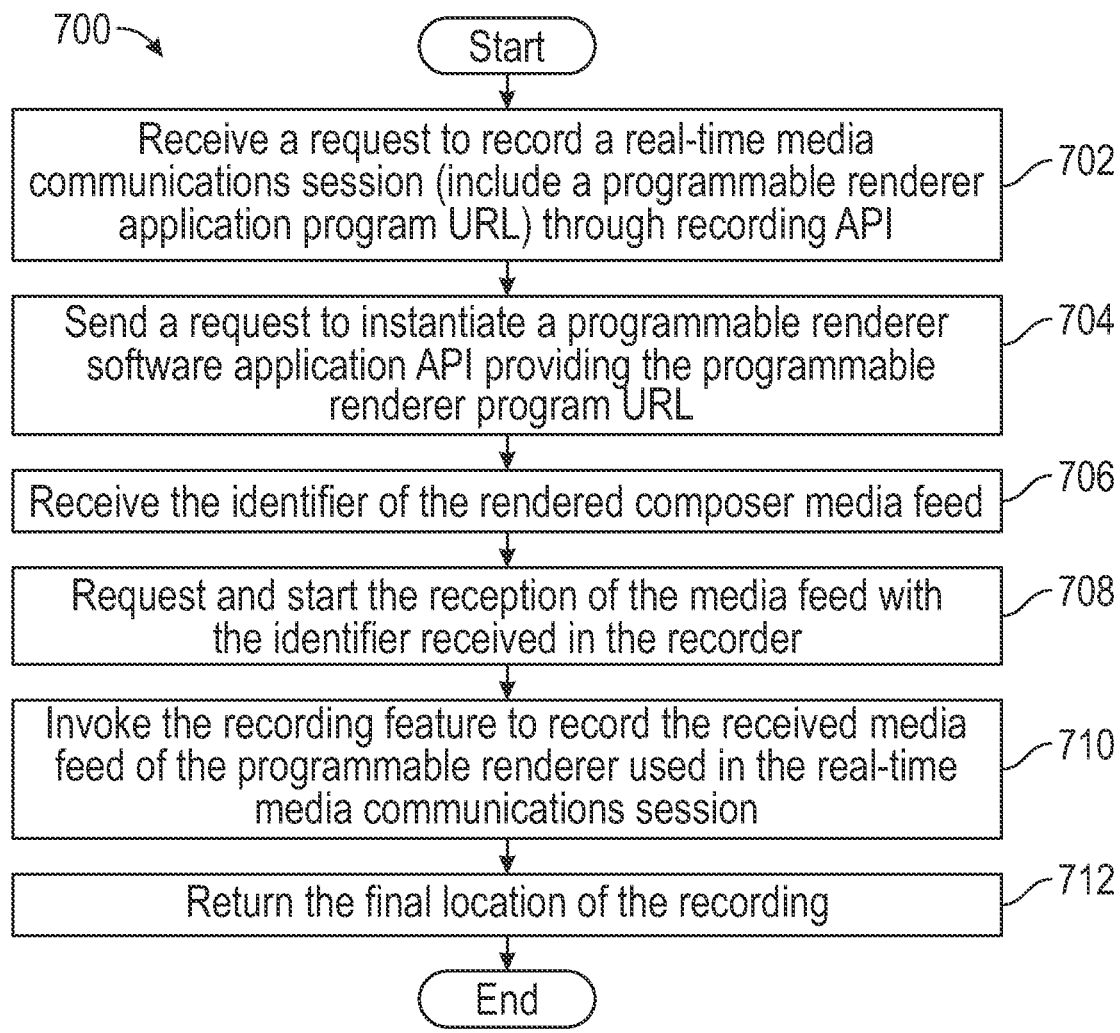
FIG. 7 is a flowchart illustrating steps of third method of providing real-time media communications services embodying the invention.

FIG. 7 illustrates steps of a method 700 that is performed by a realtime media communications recording API 400 to record a realtime media communications session. The method begins and proceeds to step 702 where the PRSA extended recording API 400 receives a request to record a real-time media communications session. The request could be received from a user, or control service, via an API user interface 402 of the API 400. Alternatively, the request could be received from a PRSA 300 via an interface of the PRSA 404 from the service controlled by the API 400. The request would include a URL, designating the location of the Application Program to load and run in the PRSA as commented previously, or some other information that would allow the API 400 to obtain the program application 306. In step 704, the extended recording API 400 instantiates a Programmable Renderer Software Application API providing the Programmable Renderer Program URL. In step 706, the identifier of the rendered composer media feed is received from the PRSA so that the rendered composed media can be retrieved and received.

As explained above, the composed media feed can include the composition of a plurality of sender participant media feeds, as well as a variety of supplementary information. In step 708, the recording unit 406 requests and starts the reception of the media feed with the identifier received in the recorder. It then invokes the recording feature to record the received media feed of the Programmable Renderer used in the Real-time Media Communications Session in step 710.

The recording unit 406 could cause the composed media feed to be recorded locally on the server upon which the API 400 is running, or on a remote or cloud server. Upon recording completion, step 712 provides the return of the final location of the recording.

The present invention may be embodied in methods, apparatus, electronic devices, and/or computer program products. Accordingly, the invention may be embodied in hardware and/or in software (including firmware, resident software, micro-code, and the like), which may be generally referred to herein as a "circuit" or "module" or "unit." Furthermore, the present invention may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device. These computer program instructions may also be stored in a computer-usable or computer-readable memory that may direct a computer or other programmable data processing apparatus to function in a particular manner, such that the instructions stored in the computer-usable or computer-readable memory produce an article of manufacture including instructions that implement the function specified in the flowchart and/or block diagram block or blocks.

The computer-usable or computer-readable medium may be, for example but not limited to, an electronic, magnetic, optical, electromagnetic, infrared, or semiconductor system, apparatus or device. More specific examples (a non-exhaustive list) of the computer-readable medium include the following: hard disks, optical storage devices, magnetic storage devices, an electrical connection having one or more wires, a portable computer diskette, a random access memory (RAM), a read-only memory (ROM), an erasable programmable read-only memory (EPROM or Flash memory), an optical fiber, and a compact disc read-only memory (CD-ROM).

Computer program code for carrying out operations of the present invention may be written in an object oriented programming language, such as Java®, Smalltalk or C++, and the like. However, the computer program code for carrying out operations of the present invention may also be written in conventional procedural programming languages, such as the "C" programming language and/or any other lower level assembler languages, as well as, and most importantly languages such as Javascript, Python, Go and similarly high abstraction level scripting languages. It will be further appreciated that the functionality of any or all of the program modules may also be implemented using discrete hardware components, one or more Application Specific Integrated Circuits (ASICs), or programmed Digital Signal Processors or microcontrollers.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present disclosure and its practical applications, to thereby enable others skilled in the art to best utilize the invention and various embodiments with various modifications as may be suited to the particular use contemplated.

Figure 8:
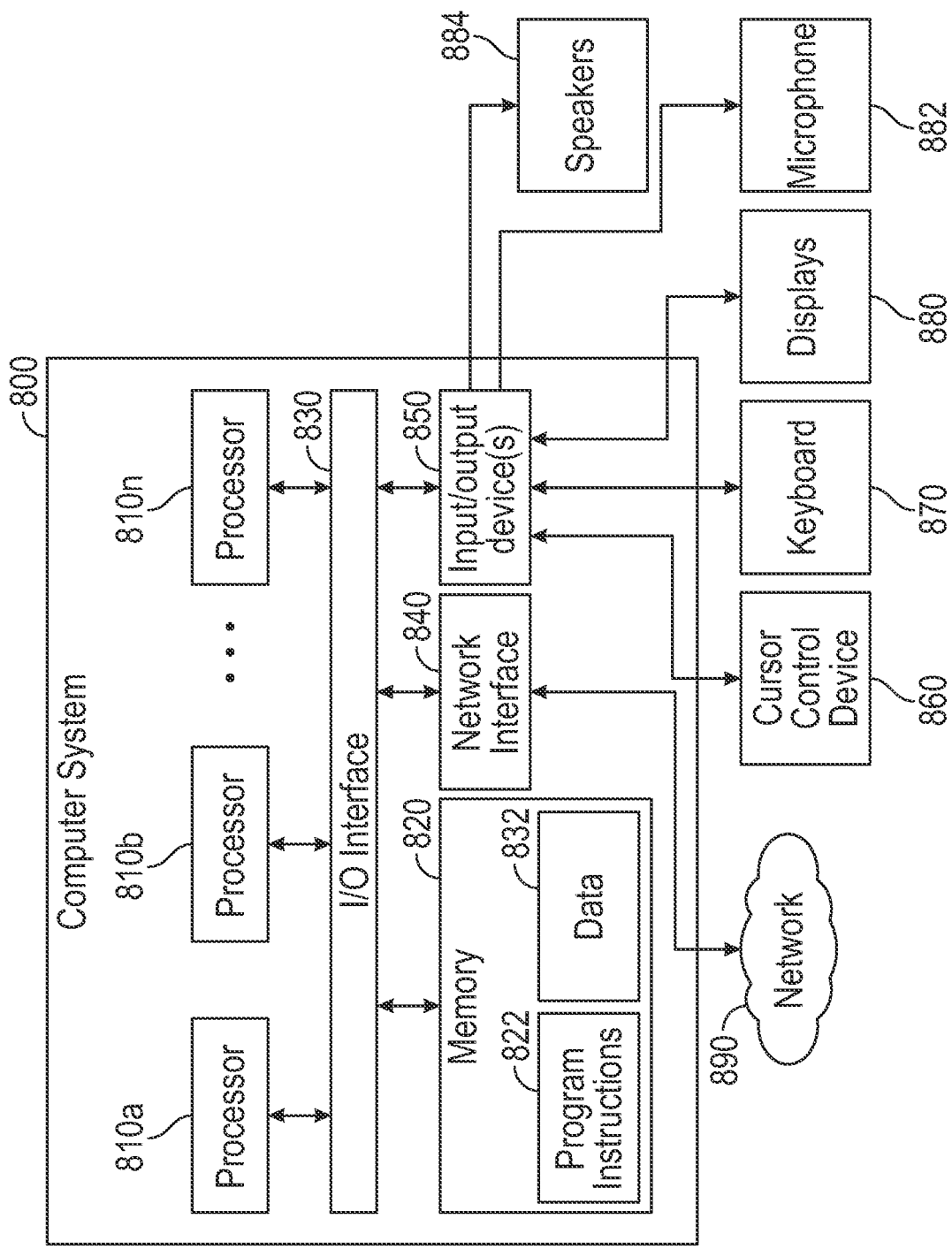
FIG. 8 illustrates a computer processing system that could embody the invention or perform methods embodying the invention.

FIG. 8 depicts a computer system 800 that can be utilized in various embodiments of the present invention to implement the invention according to one or more embodiments. The various embodiments as described herein may be executed on one or more computer systems, which may interact with various other devices. One such computer system is the computer system 800 illustrated in FIG. 8. The computer system 800 may be configured to implement the methods described above. The computer system 800 may be used to implement any other system, device, element, functionality or method of the above-described embodiments. In the illustrated embodiments, the computer system 800 may be configured to implement the disclosed methods as processor-executable executable program instructions 822 (e.g., program instructions executable by processor(s) 810) in various embodiments.

In the illustrated embodiment, computer system 800 includes one or more processors 810a-810n coupled to a system memory 820 via an input/output (I/O) interface 830. Computer system 800 further includes a network interface 840 coupled to I/O interface 830, and one or more input/output devices 850, such as cursor control device 860, keyboard 870, display(s) 880, microphone 882 and speakers 884. In various embodiments, any of the components may be utilized by the system to receive user input described above.

In various embodiments, a user interface may be generated and displayed on display 880. In some cases, it is contemplated that embodiments may be implemented using a single instance of computer system 800, while in other embodiments multiple such systems, or multiple nodes making up computer system 800, may be configured to host different portions or instances of various embodiments. For example, in one embodiment some elements may be implemented via one or more nodes of computer system 800 that are distinct from those nodes implementing other elements. In another example, multiple nodes may implement computer system 800 in a distributed manner.

In different embodiments, the computer system 800 may be any of various types of devices, including, but not limited to, a personal computer system, desktop computer, laptop, notebook, or netbook computer, a portable computing device, a mainframe computer system, handheld computer, workstation, network computer, a smartphone, a camera, a set top box, a mobile device, a consumer device, video game console, handheld video game device, application server, storage device, a peripheral device such as a switch, modem, router, or in general any type of computing or electronic device.

In various embodiments, the computer system 800 may be a uniprocessor system including one processor 810, or a multiprocessor system including several processors 810 (e.g., two, four, eight, or another suitable number). Processors 810 may be any suitable processor capable of executing instructions. For example, in various embodiments processors 810 may be general-purpose or embedded processors implementing any of a variety of instruction set architectures (ISAs). In multiprocessor systems, each of processors 810 may commonly, but not necessarily, implement the same ISA.

System memory 820 may be configured to store program instructions 822 and/or data 832 accessible by processor 810. In various embodiments, system memory 820 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within system memory 820. In other embodiments, program instructions and/or data may be received, sent or stored upon different types of computer-accessible media or on similar media separate from system memory 820 or computer system 800.

In one embodiment, I/O interface 830 may be configured to coordinate I/O traffic between processor 810, system memory 820, and any peripheral devices in the device, including network interface 840 or other peripheral interfaces, such as input/output devices 850. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computer system 800 and other devices attached to a network (e.g., network 890), such as one or more external systems or between nodes of computer system 800. In various embodiments, network 890 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 840 may support communication via wired or wireless general data networks, such as any suitable type of Ethernet network; for example, via telecommunications/telephony networks such as analog voice networks or digital fiber communications networks, via storage area networks such as Fiber Channel SANs, or via any other suitable type of network and/or protocol.

Input/output devices 850 may, in some embodiments, include one or more display terminals, keyboards, keypads, touchpads, scanning devices, voice or optical recognition devices, or any other devices suitable for entering or accessing data by one or more computer systems 800. Multiple input/output devices 850 may be present in computer system 800 or may be distributed on various nodes of computer system 800. In some embodiments, similar input/output devices may be separate from computer system 800 and may interact with one or more nodes of computer system 800 through a wired or wireless connection, such as over network interface 840.

In some embodiments, the illustrated computer system may implement any of the operations and methods described above, such as the methods illustrated by the flowcharts of FIGS. 5-7. In other embodiments, different elements and data may be included.

Those skilled in the art will appreciate that the computer system 800 is merely illustrative and is not intended to limit the scope of embodiments. In particular, the computer system and devices may include any combination of hardware or software that can perform the indicated functions of various embodiments, including computers, network devices, Internet appliances, PDAs, wireless phones, pagers, and the like. Computer system 800 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 800 may be transmitted to computer system 800 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, and the like), ROM, and the like.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of providing real time media communications amongst a plurality of interconnected computing devices using Programmable Rendering services, comprising:
    instantiating a first Programmable Renderer software application (PRSA) on a server acting as a real-time media communications multipoint control unit;
    receiving, with the first PRSA, a plurality of sender media feeds from a corresponding plurality of senders of a real-time media communication session;
    generating, with the first PRSA, a first composed media feed that combines and includes each of the plurality of sender media feeds;
    sending, via the first PRSA, the first composed media feed to a first plurality of participant computing devices;
    instantiating a second PRSA;
    receiving, with the second PRSA, the plurality of sender media feeds from the corresponding plurality of senders of the real-time media communication session;
    generating, with the second PRSA, the first composed media feed that combines and includes each of the plurality of sender media feeds; and
    sending, via the second PRSA, the first composed media feed to a second plurality of participant computing devices.

2. The method of claim 1, wherein the generating step comprises generating a first composed media feed that also includes supplemental content associated with the real-time media communications session.

3. The method of claim 2, wherein the supplemental content is selected from the group consisting of an attendee list, attendee status information; a chat window; and a supplementary information window that can be used to display supplementary information or a shared image of a sender or participant's computing device display screen.

4. The method of claim 1, wherein the second PRSA is instantiated on the same server as the first PRSA.

5. The method of claim 1, wherein the first PRSA is instantiated on a first server, and wherein the second PRSA is instantiated on a second server.

6. The method of claim 1, wherein the sending step comprises sending the first composed media feed to the first plurality of participant computing devices in near-real-time with respect to receipt of the plurality of sender media feeds.

7. The method of claim 1, further comprising:
    instantiating a web browser software application (WBSA) on a server;
    causing the WBSA to display the first composed media feed; and
    invoking a screen recording function of the WBSA to cause a copy of the first composed media feed displayed on the WBSA to be recorded at a specified memory storage location, wherein the WBSA is configured such that the screen recording function of the WBSA automatically causes the both the audio and the video of the first composed media feed to be recorded at the specified memory storage location.

8. The method of claim 7, wherein the first composed media feed displayed on the WBSA includes supplemental information in addition to the plurality of sender media feeds, and wherein the WBSA is configured such that the screen recording function of the WBSA automatically causes the supplementary information to be recorded at the specified memory storage location along with the other portions of the first composed media feed.

9. The method of claim 1, wherein the first PRSA further comprises an Application Programming Interface (API) for providing information to control the first PRSA during the real-time media communication session.

10. The method of claim 9, wherein the information is a Uniform Resource Locator (URL) at which an application to be run by the PRSA is located.

11. The method of claim 1, further comprising:
    instantiating a third PRSA;
    receiving, with the third PRSA, a plurality of sender media feeds from a corresponding plurality of senders of the real-time media communication session;
    generating, with the third PRSA, a second composed media feed that is different from the first composed media and that combines and includes each of the plurality of sender media feeds received with the third PRSA; and
    sending, via the third PRSA, the second composed media feed to a second plurality of participant computing devices.

12. A system for providing real time media communications amongst a plurality of interconnected computing devices using Programmable Rendering services, comprising:
    at least one processor; and
    a memory, wherein the at least one processor is configured to perform a method comprising the steps of:
        instantiating a first Programmable Renderer software application (PRSA) on a server acting as a real-time media communications multipoint control unit;
        receiving, with the first PRSA, a plurality of sender media feeds from a corresponding plurality of senders of a real-time media communication session;

generating, with the first PRSA, a first composed media feed that combines and includes each of the plurality of sender media feeds;

sending, via the first PRSA, the first composed media feed to a first plurality of participant computing devices;

instantiating a second PRSA;

receiving, with the second PRSA, the plurality of sender media feeds from the corresponding plurality of senders of the real-time media communication session;

generating, with the second PRSA, the first composed media feed that combines and includes each of the plurality of sender media feeds; and sending, via the second PRSA, the first composed media feed to a second plurality of participant computing devices.

13. The system of claim 12, wherein the generating step comprises generating a first composed media feed that also includes supplemental content associated with the real-time media communications session.

14. The system of claim 13, wherein the supplemental content is selected from the group consisting of an attendee list, attendee status information; a chat window; and a supplementary information window that can be used to display supplementary information or a shared image of a sender or participant's computing device display screen.

15. The system of claim 12, wherein the second PRSA is instantiated on the same server as the first PRSA.

16. The system of claim 12, wherein the first PRSA is instantiated on a first server, and wherein the second PRSA is instantiated on a second server.

17. The system of claim 12, wherein the sending step comprises sending the first composed media feed to the first plurality of participant computing devices in near-real-time with respect to receipt of the plurality of sender media feeds.

18. The system of claim 12, wherein the method performed by the at least one processor further comprises:
instantiating a web browser software application (WBSA) on a server;
causing the WBSA to display the first composed media feed; and
invoking a screen recording function of the WBSA to cause a copy of the first composed media feed displayed on the WBSA to be recorded at a specified memory storage location, wherein the WBSA is configured such that the screen recording function of the WBSA automatically causes the both the audio and the video of the first composed media feed to be recorded at the specified memory storage location.

19. The system of claim 12, wherein the method performed by the at least one processor further comprises:
instantiating a third PRSA;
receiving, with the third PRSA, a plurality of sender media feeds from the corresponding plurality of senders of the real-time media communication session;
generating, with the third PRSA, a second composed media feed that is different from the first composed media and that combines and includes each of the plurality of sender media feeds received with the third PRSA; and
sending, via the third PRSA, the second composed media feed to a second plurality of participant computing devices.

20. A method of providing real time media communications amongst a plurality of interconnected computing devices using Programmable Rendering services, comprising:
instantiating a first Programmable Renderer software application (PRSA) on a server acting as a real-time media communications multipoint control unit;
receiving, with the first PRSA, a plurality of sender media feeds from a corresponding plurality of senders of a real-time media communication session;
generating, with the first PRSA, a first composed media feed that combines and includes each of the plurality of sender media feeds;
sending, via the first PRSA, the first composed media feed to a first plurality of participant computing devices;
instantiating a web browser software application (WBSA) on a server;
causing the WBSA to display the first composed media feed; and
invoking a screen recording function of the WBSA to cause a copy of the first composed media feed displayed on the WBSA to be recorded at a specified memory storage location, wherein the WBSA is configured such that the screen recording function of the WBSA automatically causes the both the audio and the video of the first composed media feed to be recorded at the specified memory storage location.

21. The method of claim 20, wherein the first composed media feed displayed on the WBSA includes supplemental information in addition to the plurality of sender media feeds, and wherein the WBSA is configured such that the screen recording function of the WBSA automatically causes the supplementary information to be recorded at the specified memory storage location along with the other portions of the first composed media feed.

22. A system for providing real time media communications amongst a plurality of interconnected computing devices using Programmable Rendering services, comprising:
at least one processor; and
a memory, wherein the at least one processor is configured to perform a method comprising the steps of:
instantiating a first Programmable Renderer software application (PRSA) on a server acting as a real-time media communications multipoint control unit;
receiving, with the first PRSA, a plurality of sender media feeds from a corresponding plurality of senders of a real-time media communication session;
generating, with the first PRSA, a first composed media feed that combines and includes each of the plurality of sender media feeds;
sending, via the first PRSA, the first composed media feed to a first plurality of participant computing devices;
instantiating a web browser software application (WBSA) on a server;
causing the WBSA to display the first composed media feed; and
invoking a screen recording function of the WBSA to cause a copy of the first composed media feed displayed on the WBSA to be recorded at a specified memory storage location, wherein the WBSA is configured such that the screen recording function of the WBSA automatically causes the both the audio and the video of the first composed media feed to be recorded at the specified memory storage location.

\* \* \* \* \*

UNITED STATES PATENT AND TRADEMARK OFFICE
CERTIFICATE OF CORRECTION

PATENT NO. : 11,924,257 B2
APPLICATION NO. : 17/743666
DATED : March 5, 2024
INVENTOR(S) : Oscar Divorra Escoda et al.

It is certified that error appears in the above-identified patent and that said Letters Patent is hereby corrected as shown below:

In the Specification

Column 1, Line 50, "10" should read --1C--

Column 1, Line 53, "10" should read --1C--

Column 2, Line 19, "10" should read --1C--

Signed and Sealed this
Fourth Day of June, 2024

Katherine Kelly Vidal
*Director of the United States Patent and Trademark Office*